United States Patent
Ma et al.

(10) Patent No.: US 11,189,263 B2
(45) Date of Patent: Nov. 30, 2021

(54) VOICE DATA PROCESSING METHOD, VOICE INTERACTION DEVICE, AND STORAGE MEDIUM FOR BINDING USER IDENTITY WITH USER VOICE MODEL

(71) Applicant: TENCENT TECHNOLOGY (SHENZHEN) COMPANY LIMITED, Shenzhen (CN)

(72) Inventors: Long Ma, Shenzhen (CN); Jun Li, Shenzhen (CN); Li Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 181 days.

(21) Appl. No.: 16/600,421

(22) Filed: Oct. 11, 2019

(65) Prior Publication Data
US 2020/0043471 A1 Feb. 6, 2020

Related U.S. Application Data

(63) Continuation of application No. PCT/CN2018/116590, filed on Nov. 21, 2018.

(30) Foreign Application Priority Data

Nov. 24, 2017 (CN) .......................... 201711191651.3

(51) Int. Cl.
  *G10L 15/07* (2013.01)
  *G10L 15/22* (2006.01)
  *G10L 17/24* (2013.01)
(52) U.S. Cl.
  CPC .............. *G10L 15/07* (2013.01); *G10L 15/22* (2013.01); *G10L 17/24* (2013.01)

(58) Field of Classification Search
  CPC ................................ G10L 15/04; G10L 15/22
  See application file for complete search history.

(56) References Cited

U.S. PATENT DOCUMENTS

2003/0088414 A1* 5/2003 Huang .................... G10L 17/04
                                                          704/246
2005/0187770 A1* 8/2005 Kompe ................. G10L 15/065
                                                          704/250
(Continued)

FOREIGN PATENT DOCUMENTS

| CN | 103337241 A | 10/2013 |
| CN | 103903621 A | 7/2014 |

(Continued)

OTHER PUBLICATIONS

Khoury, Elie, et al. "Hierarchical speaker clustering methods for the nist i-vector challenge." Odyssey: The Speaker and Language Recognition Workshop. No. CONF. 2014. (Year: 2014).*

(Continued)

*Primary Examiner* — Jialong He
(74) *Attorney, Agent, or Firm* — Anova Law Group, PLLC

(57) ABSTRACT

A voice data processing method includes acquiring historical voice data, acquiring historical voice feature vectors corresponding to the historical voice data, and performing clustering on the historical voice feature vectors to obtain a voice feature cluster, the voice feature cluster comprising at least one historical voice feature vector with a similar feature. The method also includes, when the voice feature cluster matches a high-frequency user condition, training a corresponding user voice model according to the historical voice feature vectors contained in the voice feature cluster; after a current voice feature vector of the current voice data matches the user voice model, initiating a user identity association request associated with the current voice data;

(Continued)

and, after a response message corresponding to the user identity association request is received, binding user identity information in the response message to the user voice model.

17 Claims, 10 Drawing Sheets

(56) References Cited

U.S. PATENT DOCUMENTS

| | | | | |
|---|---|---|---|---|
| 2009/0119103 A1* | 5/2009 | Geri | ......................... | G10L 17/04 704/243 |
| 2011/0295603 A1* | 12/2011 | Meisel | .................... | G10L 15/07 704/246 |
| 2012/0130714 A1* | 5/2012 | Zeljkovic | ................ | G10L 17/04 704/235 |
| 2013/0225128 A1* | 8/2013 | Gomar | .................. | H04W 12/06 455/411 |
| 2014/0222423 A1* | 8/2014 | Cumani | .................. | G10L 17/02 704/234 |
| 2016/0350610 A1* | 12/2016 | Yoo | ....................... | G06K 9/6272 |
| 2018/0286410 A1 | 10/2018 | Jin et al. | | |

FOREIGN PATENT DOCUMENTS

| | | |
|---|---|---|
| CN | 105869645 A | 8/2016 |
| CN | 107978311 A | 5/2018 |
| EP | 3057092 A1 | 8/2016 |

OTHER PUBLICATIONS

The World Intellectual Property Organization (WIPO) International Search Report for PCT/CN2018/116590 dated Feb. 19, 2019 5 Pages (including translation).

* cited by examiner

VOICE DATA PROCESSING METHOD, VOICE INTERACTION DEVICE, AND STORAGE MEDIUM FOR BINDING USER IDENTITY WITH USER VOICE MODEL

RELATED APPLICATIONS

This application is a continuation application of PCT Patent Application No. PCT/CN2018/116590, filed on Nov. 21, 2018, which claims priority to Chinese Patent Application No. 201711191651.3, entitled "VOICE DATA PROCESSING METHOD, APPARATUS, AND VOICE INTERACTION DEVICE" filed with National Intellectual Property Administration, PRC on Nov. 24, 2017, content of all of which is incorporated by reference in its entirety.

FIELD OF THE TECHNOLOGY

This application relates to the field of computer technologies and, in particular, to a voice data processing method, a voice interaction device, and a storage medium.

BACKGROUND

With the development of a voice recognition technology, the voice recognition technology is used on an increasing number of products, such as voice-controlled automobiles, speakers, and televisions, etc. In other words, a voice interaction device can recognize voice of a speaker and implement automatic control according to the recognized content.

The voice interaction device that can perform voice recognition may provide personalized service according to voice features of different speakers. However, before that, the speaker needs to actively perform voice registration on the voice interaction device, to register a relationship between a voice feature of the speaker and information about the speaker, so that permission corresponding to the information about the speaker may be provided after it is subsequently recognized that a voice matches a voice feature of the speaker. A current voice registration process generally needs the speaker to repeatedly and clearly say a fixed sentence for many times into the voice interaction device, to extract the voice feature of the speaker. It can be seen that the current voice registration mode needs to be actively initiated by the speaker, and registration may take a long time, causing low voice registration efficiency. In addition, during the voice registration, voice content of the speaker is easily caused to be different from the fixed sentence provided by a system due to carelessness, further causing a failure of voice registration, and thereby reducing a success rate of the voice registration.

The disclosed methods and systems are directed to solve one or more problems set forth above and other problems.

SUMMARY

Embodiments of this application provide a voice data processing method, a voice interaction device, and a storage medium, so that voice registration efficiency can be improved and a success rate of voice registration can be improved.

One aspect of this application provides a voice data processing method performed by a voice interaction device. The method includes acquiring historical voice data, acquiring historical voice feature vectors corresponding to the historical voice data, and performing clustering on the historical voice feature vectors to obtain a voice feature cluster, the voice feature cluster comprising at least one historical voice feature vector with a similar feature. The method also includes, after it is determined that the voice feature cluster matches a high-frequency user condition, training a corresponding user voice model according to the historical voice feature vectors contained in the voice feature cluster; after it is detected that a current voice feature vector of the current voice data matches the user voice model, initiating a user identity association request associated with the current voice data; and after it is determined that a response message corresponding to the user identity association request is received, binding user identity information in the response message to the user voice model.

Another aspect of this application provides a voice interaction device. The voice interaction device includes a memory configured to store program code; and a processor being connected to the memory and being configured to invoke the program code to perform: acquiring historical voice data, acquiring historical voice feature vectors corresponding to the historical voice data, and performing clustering on the historical voice feature vectors to obtain a voice feature cluster, the voice feature cluster comprising at least one historical voice feature vector with a similar feature. The method also includes, after it is determined that the voice feature cluster matches a high-frequency user condition, training a corresponding user voice model according to the historical voice feature vectors contained in the voice feature cluster; after it is detected that a current voice feature vector of the current voice data matches the user voice model, initiating a user identity association request associated with the current voice data; and after it is determined that a response message corresponding to the user identity association request is received, binding user identity information in the response message to the user voice model.

Another aspect of this application provides a non-transitory computer-readable storage medium. The non-transitory computer-readable storage medium stores computer program instructions executable by at least one processor to perform: acquiring historical voice data, acquiring historical voice feature vectors corresponding to the historical voice data, and performing clustering on the historical voice feature vectors to obtain a voice feature cluster, the voice feature cluster comprising at least one historical voice feature vector with a similar feature. The method also includes, after it is determined that the voice feature cluster matches a high-frequency user condition, training a corresponding user voice model according to the historical voice feature vectors contained in the voice feature cluster; after it is detected that a current voice feature vector of the current voice data matches the user voice model, initiating a user identity association request associated with the current voice data; and after it is determined that a response message corresponding to the user identity association request is received, binding user identity information in the response message to the user voice model.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings show merely some embodiments of the present disclosure, and a person of ordinary skill in the art may still derive other drawings from the accompanying drawings without creative efforts.

DETAILED DESCRIPTION

The following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the embodiments of the present disclosure without creative efforts shall fall within the protection scope of the present disclosure.

Figure 1:
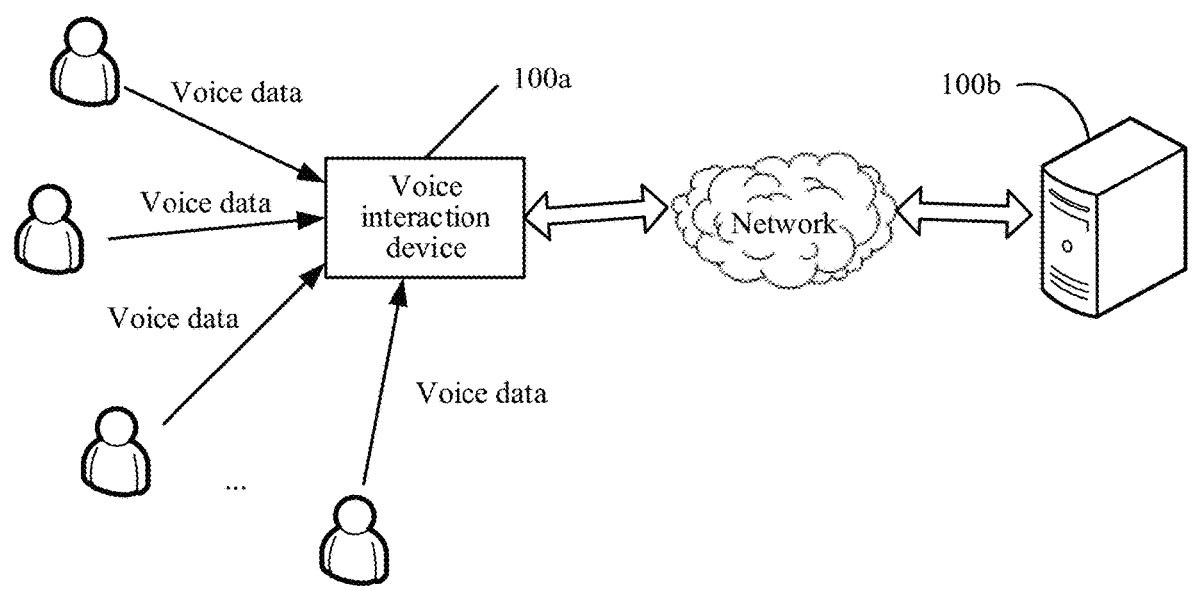
FIG. 1 is a schematic diagram of a system architecture according to an embodiment of the present disclosure.

Referring to FIG. 1, a schematic diagram of a system architecture according to an embodiment of the present disclosure is shown. As shown in FIG. 1, the system architecture may include a voice interaction device 100a and a backend server 100b. The voice interaction device 100a may be connected to the backend server 100b through the Internet. The voice interaction device 100a may include a smart device that may perform voice recognition, such as an intelligent speaker, a smart phone, a computer, a smart television, and a smart air conditioner, etc.

The voice interaction device 100a may receive voice data of a user and send the voice data to the backend server 100b, so that the backend server 100b may perform voice recognition on the voice data and generate a control instruction according to the recognized meaning, and the voice interaction device 100a receives the control instruction sent by the backend server 100b to perform a corresponding control operation. For example, when the user says "play song A" into the voice interaction device 100a, the voice interaction device 100a may send the voice data of "play song A" to the backend server 100b, so that the backend server 100b performs voice recognition on the voice data of "play song A" and generates a corresponding control instruction, and the voice interaction device 100a receives the control instruction and plays the song A according to the control instruction.

Figure 2A:
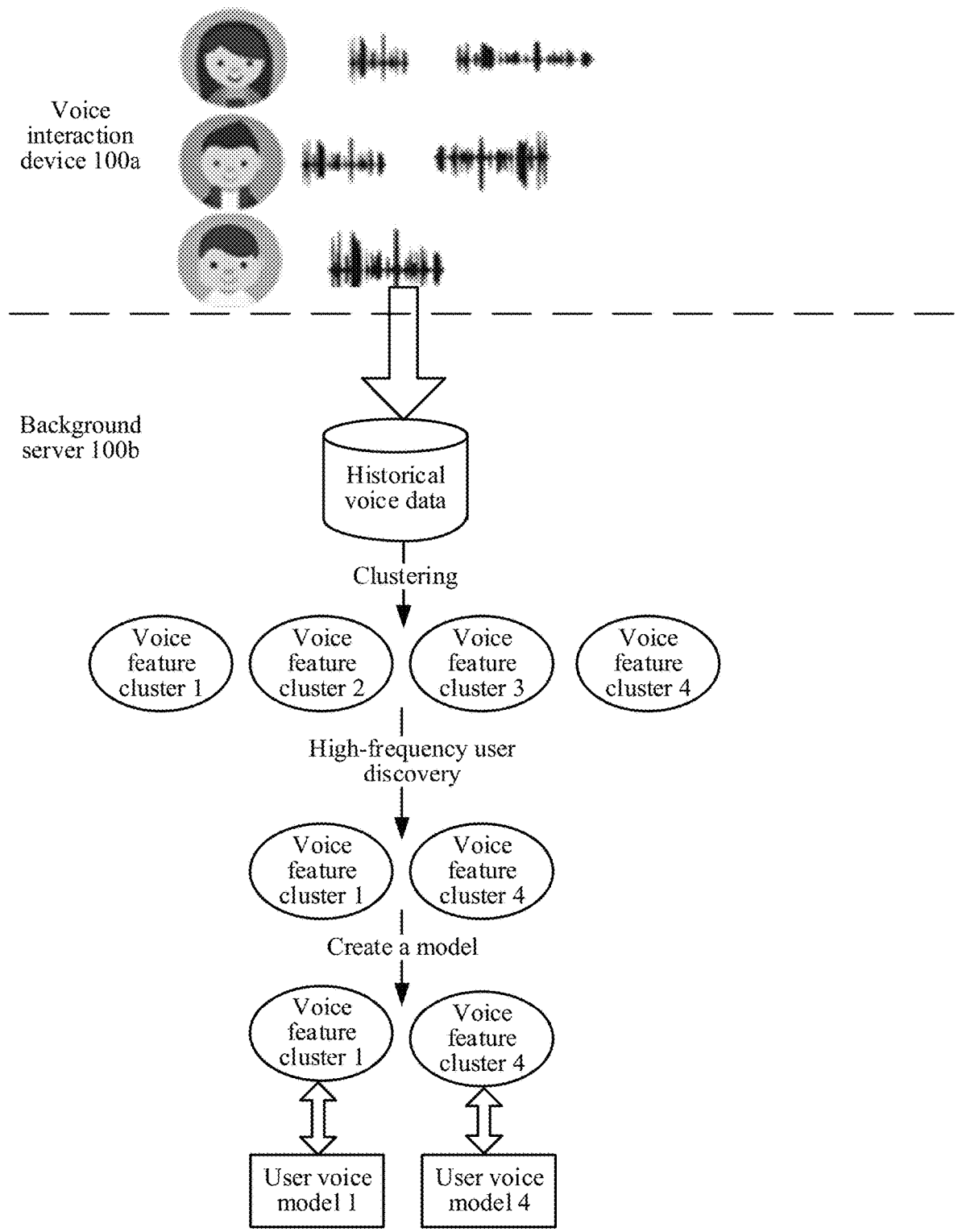
FIG. 2A is a schematic scene diagram of a voice data processing method according to an embodiment of the present disclosure.

The backend server 100b may further find a high-frequency user according to the voice data sent by the voice interaction device 100a and actively initiate an identity registration to the high-frequency user. For the process, reference may be made to FIG. 2A to FIG. 2C together, both of which are schematic scene diagrams of a voice data processing method according to embodiments of the present disclosure. As shown in FIG. 2A, the voice interaction device 100a may receive voice data of a plurality of users, and each piece of the voice data may be forwarded to the backend server 100b. For a process of performing voice control according to the voice data, reference is made to the embodiment corresponding to the foregoing FIG. 1. Therefore, the backend server 100b may store a large amount of voice data to form historical voice data.

As shown in FIG. 2A, the backend server 100b may perform clustering on all historical voice data to obtain a voice feature cluster 1, a voice feature cluster 2, a voice feature cluster 3, and a voice feature cluster 4, each voice feature cluster including at least one historical voice feature vector with a similar feature. The historical voice feature vector may refer to an i-Vector corresponding to historical voice data.

As shown in FIG. 2A, the backend server 100b may further find a high-frequency user based on all of the voice feature clusters. In particular, it may be determined, through analyzing a number of historical voice feature vectors and distribution density of the historical voice feature vectors in each voice feature cluster, whether a user corresponding to a voice feature cluster is the high-frequency user. In FIG. 2A, the backend server 100b obtains, through analysis, a result that users corresponding to the voice feature cluster 1 and the voice feature cluster 4 belong to the high-frequency user (a user who frequently sends the voice data to the voice interaction device 100a may be determined as a high-frequency user), and the backend server 100b further creates a corresponding user voice model 1 for the voice feature cluster 1 and creates a corresponding user voice model 4 for the voice feature cluster 4. The user voice model 1 and the user voice model 4 both belong to a user voice model that is not bound to user identity information, that is, an unregistered user voice model.

Figure 2B:
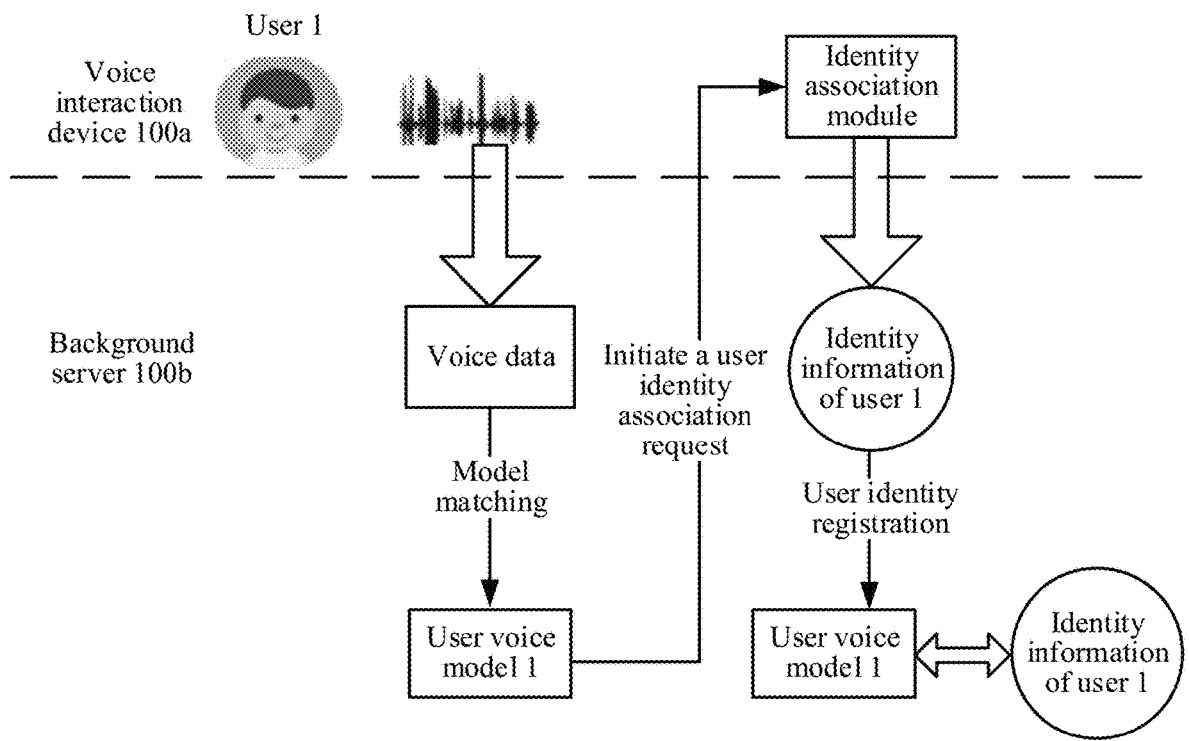
FIG. 2B is a schematic scene diagram of another voice data processing method according to an embodiment of the present disclosure.

Further, as shown in FIG. 2B, the voice interaction device 100a may forward voice data of a user 1 at a current moment to a backend server 100b. For a process of performing voice control according to the voice data, reference is made to the embodiment corresponding to the foregoing FIG. 1. The backend server 100b may perform model matching on the voice data. In particular, the i-Vector corresponding to the voice data is compared to the user voice model 1 and the user voice model 4 in FIG. 2A respectively.

As shown in FIG. 2B, the user voice model 1 matches the voice data. In this case, a user identity association request corresponding to the user voice model 1 may be initiated to the voice interaction device 100a, and an identity association module in the voice interaction device 100a may send a user registration prompt tone (for example, the prompt tone is "Please enter your identity information") to the user 1. The user 1 may send the identity information of the user 1 to the voice interaction device 100a through voice or a client according to the prompt tone, the voice interaction device 100a forwards the identity information of the user 1 to the backend server 100b, and the backend server 100b may perform user identity registration on the identity information of the user 1. In other words, the registration process is binding the user voice model 1 to the identity information of the user 1. The user voice model 1 belongs to a user voice model that is bound to user identity information, that is, a registered user voice model. The user voice model 4 still belongs to a user voice model that is not bound to the user identity information. It can be seen that a problem that the user needs to send voice content with a fixed sentence repeatedly for a plurality of times to implement voice registration may be avoided. In other words, the user only needs to respond to a user identity association request initiated by the voice interaction device to complete voice registration, further improving efficiency of the voice registration.

Figure 2C:
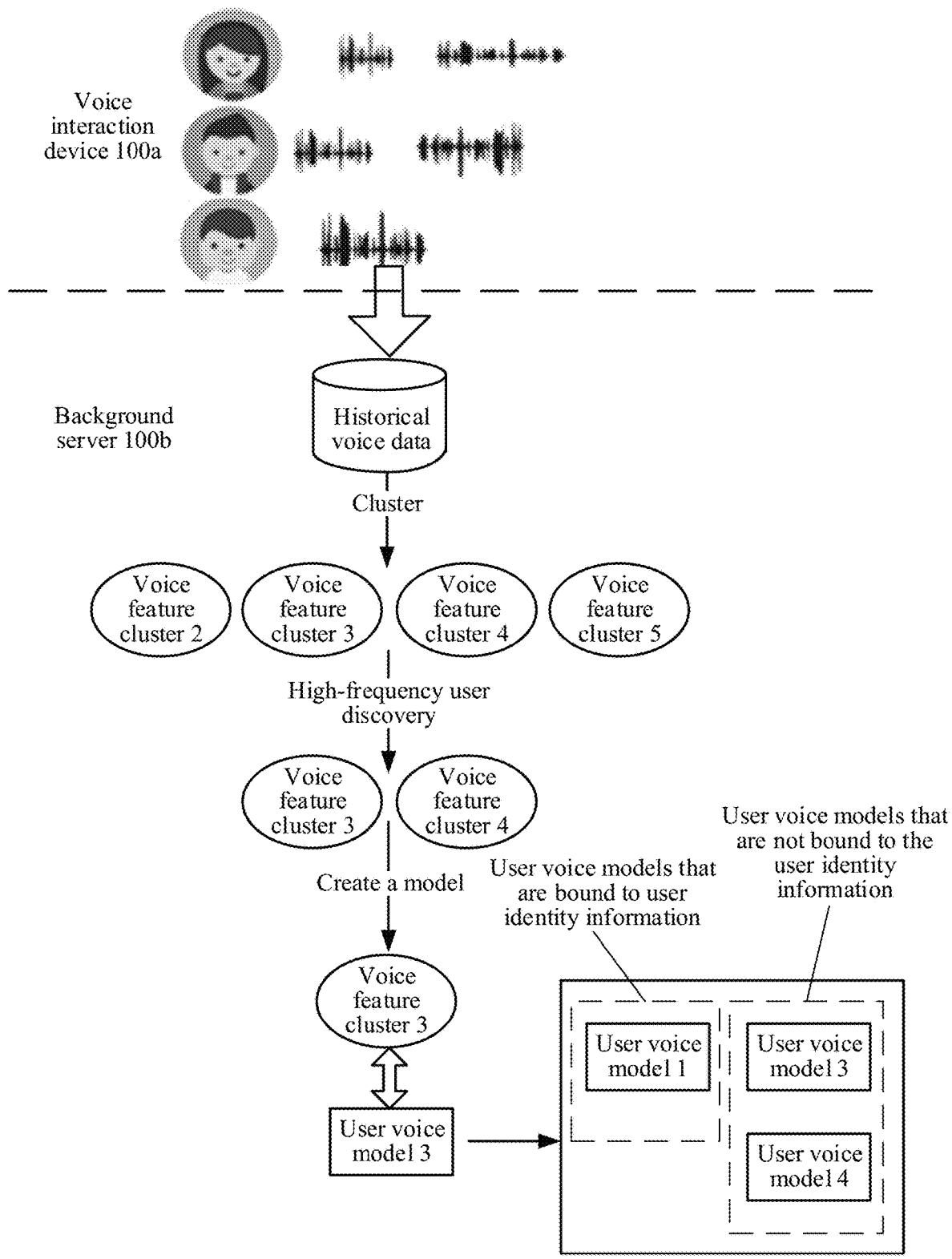
FIG. 2C is a schematic scene diagram of another voice data processing method according to an embodiment of the present disclosure.

After identity information is bound to the user voice model 1, as shown in FIG. 2C, the backend server 100b may keep receiving voice data sent by the voice interaction device 100a, to form more historical voice data. In order to ensure that the backend server 100b may continually find a new high-frequency user, the backend server 100b may perform re-clustering on the historical voice data regularly or quantitatively. In FIG. 2c, the backend server 100b may perform clustering on other historical voice data other than the historical voice data that matches a user voice model 1 in all the historical voice data (because the user voice model 1 completes registration, there is no need to perform clustering on the historical voice data that matches the user voice model 1), to obtain a voice feature cluster 2, a voice feature cluster 3, a voice feature cluster 4, and a voice feature cluster 5. The voice feature cluster 2 in FIG. 2C may contain the voice feature cluster 2 in FIG. 2A, and may further contain some newly increased historical voice feature vectors. The voice feature cluster 3 in FIG. 2C may contain the voice feature cluster 3 in FIG. 2A, and may further contain some newly increased historical voice feature vectors. The voice feature cluster 4 in FIG. 2C may contain the voice feature cluster 4 in FIG. 2A, and may further contain some newly increased historical voice feature vectors. The voice feature cluster 5 in FIG. 2C is a newly increased voice feature cluster. The backend server 100b further finds high-frequency users in the voice feature cluster 2, the voice feature cluster 3, the voice feature cluster 4, and the voice feature cluster 5, and further obtains, through analysis, a result that users corresponding to the voice feature cluster 3 and the voice feature cluster 4 are high-frequency users. Because the voice feature cluster 4 has a corresponding user voice model 4, it is only required to create a user voice model 3 corresponding to the voice feature cluster 3. The existing user voice model 4 may be updated through all historical voice feature vectors in the voice feature cluster 4 in FIG. 2C.

As shown in FIG. 2C, in this case, the user voice model in the backend server 100b includes the user voice model 1, a user voice model 3, and the user voice model 4. The user voice model 1 is a user voice model that is bound to user identity information, and the user voice model 3 and the user voice model 4 are user voice models that are not bound to the user identity information. Therefore, when it is subsequently detected that voice data matches the user voice model 3 or the user voice model 4, user identity registration may be initiated. With an increase in the number of users, more user voice models that are not bound to the user identity information may be increased. In addition, based on a mechanism that user identity is automatically registered, a user voice model that is not bound to the user identity information may be gradually converted into a user voice model that is bound to the user identity information, that is, identity registration of each high-frequency user is gradually completed.

All functions of the backend server 100b may be integrated into a voice interaction device 100a, that is, the voice interaction device 100a may directly perform voice recognition on voice data to implement voice control. The voice interaction device 100a may also directly find the high-frequency user according to received voice data and actively initiate identity registration to the high-frequency user.

In the following embodiments corresponding to FIG. 3 to FIG. 9 below, that a backend server 100b is integrated into a voice interaction device 100a is used as an example. A specific process of finding a high-frequency user and actively initiating identity registration to the high-frequency user is described in detail.

Figure 3:
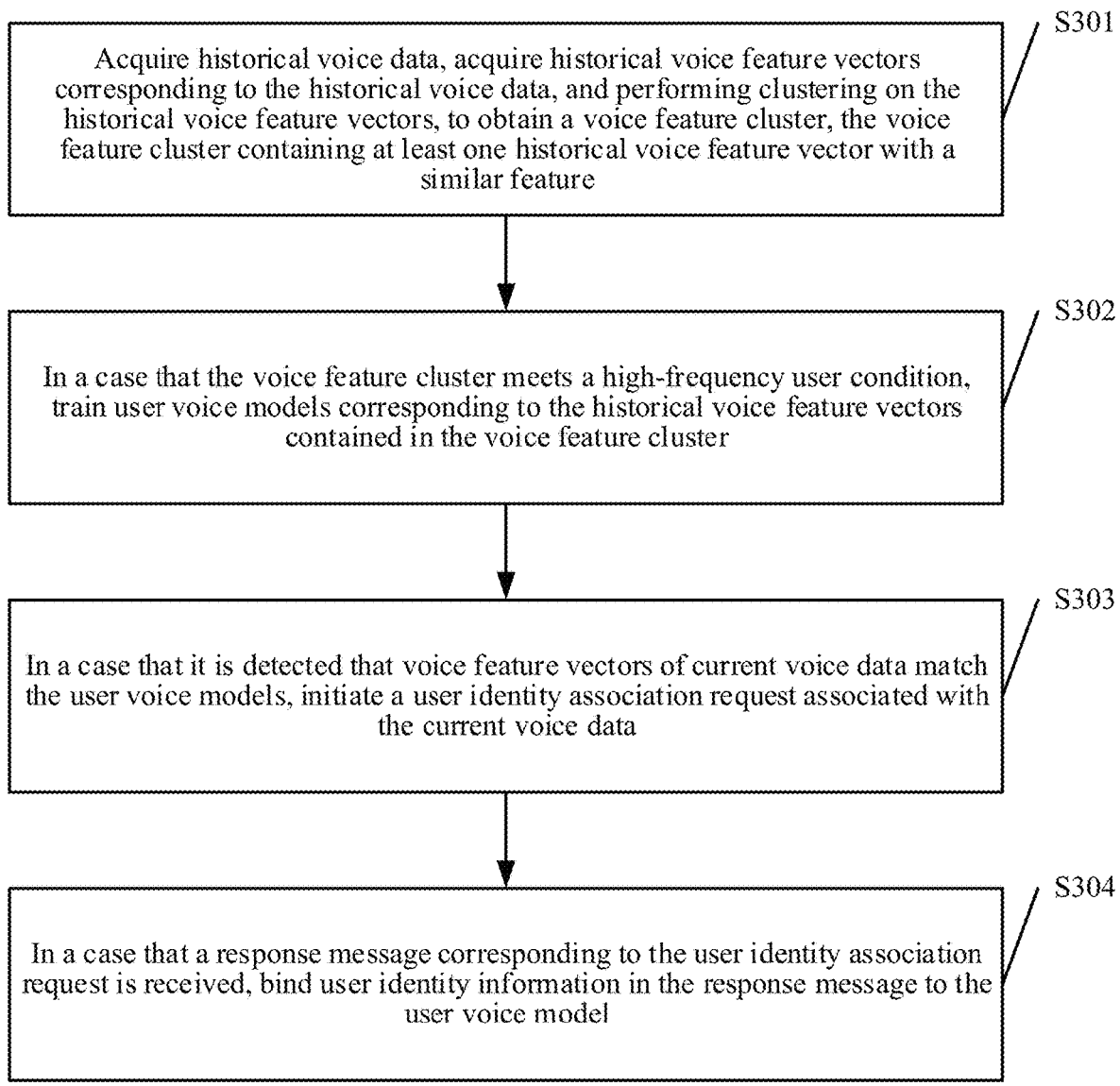
FIG. 3 is a schematic flowchart of a voice data processing method according to an embodiment of the present disclosure.

Referring to FIG. 3, a schematic flow chart of a voice data processing method according to an embodiment of the present disclosure is shown, and the method may include the followings.

S301. Historical voice data is acquired, historical voice feature vectors corresponding to the historical voice data are acquired, and clustering is performed on the historical voice feature vectors to obtain a voice feature cluster, the voice feature cluster including at least one historical voice feature vector with a similar feature.

In particular, after a voice interaction device (the voice interaction device may be specifically a voice interaction device 100a integrating all functions of the backend server 100b in a corresponding embodiment of the foregoing FIG. 1) is started, the voice interaction device may directly recognize a meaning of acquired user voice, and further perform a control operation associated with the meaning. The voice interaction device may include smart devices such as an audio device/a speaker, a television, an automobile, a mobile phone, and a Virtual Reality (VR) device that are capable of performing voice interaction recognition and control. For example, when a user says "play next song" to the voice interaction device, the voice interaction device may switch a current song to the next song for playing after obtaining the meaning through analysis. Therefore, the voice interaction device may enable a voice control function with no need to wait until the user completes the voice registration. In other words, the voice interaction device may perform an associated control operation according to voice content of the user before a voice feature of the user is bound to user identity information. In addition, a plurality of different users may say user voice to the voice interaction device, so that the voice interaction device may perform the associated control operation according to various user voice instructions. The voice interaction device may further record and save all the user voice and determine each piece of the saved user voice as historical voice data.

When an amount of the saved historical voice data reaches a first amount threshold, all historical voice data is acquired, and a historical voice feature vector corresponding to each piece of historical voice data is determined. The historical voice feature vector may be an i-vector (identity-vector). A process of acquiring the i-vector may include: first using all historical voice data for training to obtain a high-order Gaussian Mixture Model (GMM), GMM being used to depict a voice feature space of a speaker, and this model being usually called a Universal Background Model (UBM), that is, the GMM-UBM model; then using the GMM-UBM model to perform parameter estimation on each piece of the historical voice data, to determine zero-order, first-order, and second-order Baum-Welch statistics corresponding to a blend weight, a mean vector, and a variance matrix of each component of the Gaussian Mixture Model, and using Expectation Maximization Algorithm (EM) to iteratively obtain a global difference matrix T; through the matrix T, projecting the speaker and a channel-related characteristic implied in a high-dimensional speaker voice space of each piece of the historical voice data to a low-dimensional space, thereby obtaining a historical voice feature vector of each piece of the historical voice data, that is, an i-Vector. In other words, a specific formula for determining the i-Vector may be: M=m+Tw, M representing a high-dimensional mean supervector of the Gaussian Mixture Model, m representing a supervector unrelated to speaker information and channel information, T being a global difference space, and w being a global difference factor (that is, an i-Vector) containing the speaker information and the channel information in an entire piece of voice. The global difference matrix T may also be trained based on a deep neural network.

The voice interaction device may further reduce dimensionality of the historical voice feature vector, and perform clustering, according to a target clustering model parameter, on the historical voice feature vector upon dimensionality reduction, to obtain a voice feature cluster. A process of dimensionality reduction of the historical voice feature vector may include: using algorithms such as Principal Component Analysis (PCA), t-distributed stochastic neighbor embedding (t-SNE), and Linear Discriminant Analysis (LDA) to perform data dimensionality reduction on the acquired historical voice feature vector (that is, the i-vector), removing a redundant multi-collinear component in the data, and reducing a calculated amount of clustering. The dimensionality reduction using PCA and t-SNE is unsupervised, that is, it is not necessary to train a model in advance, and PCA and t-SNE may be directly applied to dimensionality reduction of the i-vector. It is necessary to use, in advance, i-vector data with an actual label to train an optimal projection direction for dimensionality reduction using LDA, and then apply the i-vector data to the dimensionality reduction of the i-vector.

A specific process for performing clustering on all of the historical voice feature vectors may include: using Density-Based Spatial Clustering of Applications with Noise (DBSCAN) clustering algorithm is used, and using an Euclidean distance is used as distance measurement of a sample to assemble, into a cluster (that is, a voice feature cluster), the historical voice feature vectors upon dimensionality reduction. The DBSCAN clustering algorithm may be used to find out an out-of-shape cluster in a feature space, and it is not necessary to set a number of clusters in advance during clustering, so that a scenario requirement for which a number of speakers is unknown can be satisfied in the embodiment of the present disclosure.

S302. In a case that the voice feature cluster matches a high-frequency user condition, a corresponding user voice model is trained according to the historical voice feature vectors contained in the voice feature cluster.

In particular, after at least one voice feature cluster is generated, for each voice feature cluster, it may be determined, according to a number of historical voice feature vectors in the voice feature cluster and distribution of the historical voice feature vectors in the voice feature cluster, whether the voice feature cluster matches a high-frequency condition. For example, when the number of the historical voice feature vectors in the voice feature cluster exceeds a preset number threshold, and when distribution density of the historical voice feature vectors in the voice feature cluster also exceeds a preset density threshold, it may be determined that the voice feature cluster matches the high-frequency user condition, that is, it indicates that a speaker corresponding to the voice feature cluster is a user who often performs voice interaction with the voice interaction device.

After it is determined that a voice feature cluster matches the high-frequency user condition, a corresponding user voice model may be trained according to the historical voice feature vectors contained in the voice feature cluster. A process of training the user voice model may include: acquiring all historical voice feature vectors that meet the high-frequency user condition in the voice feature cluster, calculating a mean value or an interpolation of the acquired historical voice feature vectors, to obtain a target historical voice feature vector, and using the target historical voice feature vector as a model parameter of the user voice model corresponding to the voice feature cluster. The mean value of the historical voice feature vectors in the voice feature cluster may be calculated in the following way: adding up all historical voice feature vectors in the voice feature cluster, and then dividing the added result by the number of historical voice feature vectors in the voice feature cluster, to obtain a target historical voice feature vector. Alternatively, the mean value of the historical voice feature vectors in the voice feature cluster may be calculated in the following way: performing weight addition on the historical voice feature vectors in the voice feature cluster according to a weight coefficient, and then dividing the added result by the number of the historical voice feature vectors in the voice feature cluster, to obtain a target historical voice feature vector.

S303. In a case that it is detected that a voice feature vector of current voice data matches the user voice model, a user identity association request associated with the current voice data is initiated.

In particular, the voice interaction device acquires a voice feature vector (that is, an i-vector) of the voice data each time receiving a piece of voice data, and then compares the voice feature vector of the voice data to each created user voice model. In a case that a piece of currently received voice data (that is, current voice data) matches a user voice model, and the user voice model is not bound to user identity information, the voice interaction device may initiate a user identity association request associated with the current voice data. A specific form of the user identity association request may include: a voice prompt (for example, a piece of voice of "please bind your identity information" sent by the voice interaction device) for performing user identity association, or a registration interface (for example, the registration interface may be displayed on a user's mobile phone, and the user fill own identity information on the registration interface, or the user may bind a user account on the registration interface to complete the voice registration) that is configured to perform user identity association and sent to a user terminal. A vector distance between an i-vector of the current voice data and an i-vector in each user voice model may be respectively determined through the Euclidean distance, and a user voice model with the vector distance being less than a distance threshold is determined as a user voice model that matches the current voice data.

In a case that the user voice model that matches the current voice data is a user voice model that is bound to the user identity information, a voice feature vector corresponding to the current voice data is saved to a voice feature cluster corresponding to a matched user voice model, so that the user voice model is subsequently updated to improve accuracy of the user voice model. In addition, the voice interaction device may also provide a speaker corresponding to the current voice data with a corresponding personalized service according to the user voice model. For example, in a case that the current voice data is "play song A", the voice interaction device may acquire, according to user identity information bound to the user voice model, a user habit parameter (such as a tone and volume that the user likes) corresponding to the user identity information, and adjust and play a voice frequency parameter of the song A according to the user habit parameter. Alternatively, in a case that the user identity information bound to the user voice model is administrator identity information, the voice interaction device may open system administration authority to the speaker corresponding to the current voice data.

S304. In a case that a response message corresponding to the user identity association request is received, user identity information in the response message is bound to the user voice model.

In particular, after the voice interaction device initiates the user identity association request, the speaker corresponding to the current voice data may feed back a corresponding response message through voice to complete voice registration. For example, the speaker may say a response message of "my identity information is XXXX", and then the voice interaction device may learn, through voice recognition, that user identity information in the response message is "XXXX", and further bind the user identity information "XXXX" to a user voice model that matches the current voice data.

Alternatively, in a case that a specific form of the user identity association request is a registration interface that is configured to perform user identity association and that is sent to a user terminal, the speaker corresponding to the current voice data may input a corresponding response message through the registration interface to complete voice registration. For example, the registration interface contains a user-name input box, a password input box, and a user hobby and interest input box, etc. The speaker may input corresponding data in each input box in the registration interface, and after "submit" is clicked, a user terminal may package the input data in the registration interface as a response message, and send the response message to a voice interaction device, so that the voice interaction device binds user identity information (for example, information such as a user name, a password, and user hobby and interest, etc. input into the registration interface) in the response message to the user voice model that matches the current voice data.

Figure 4:
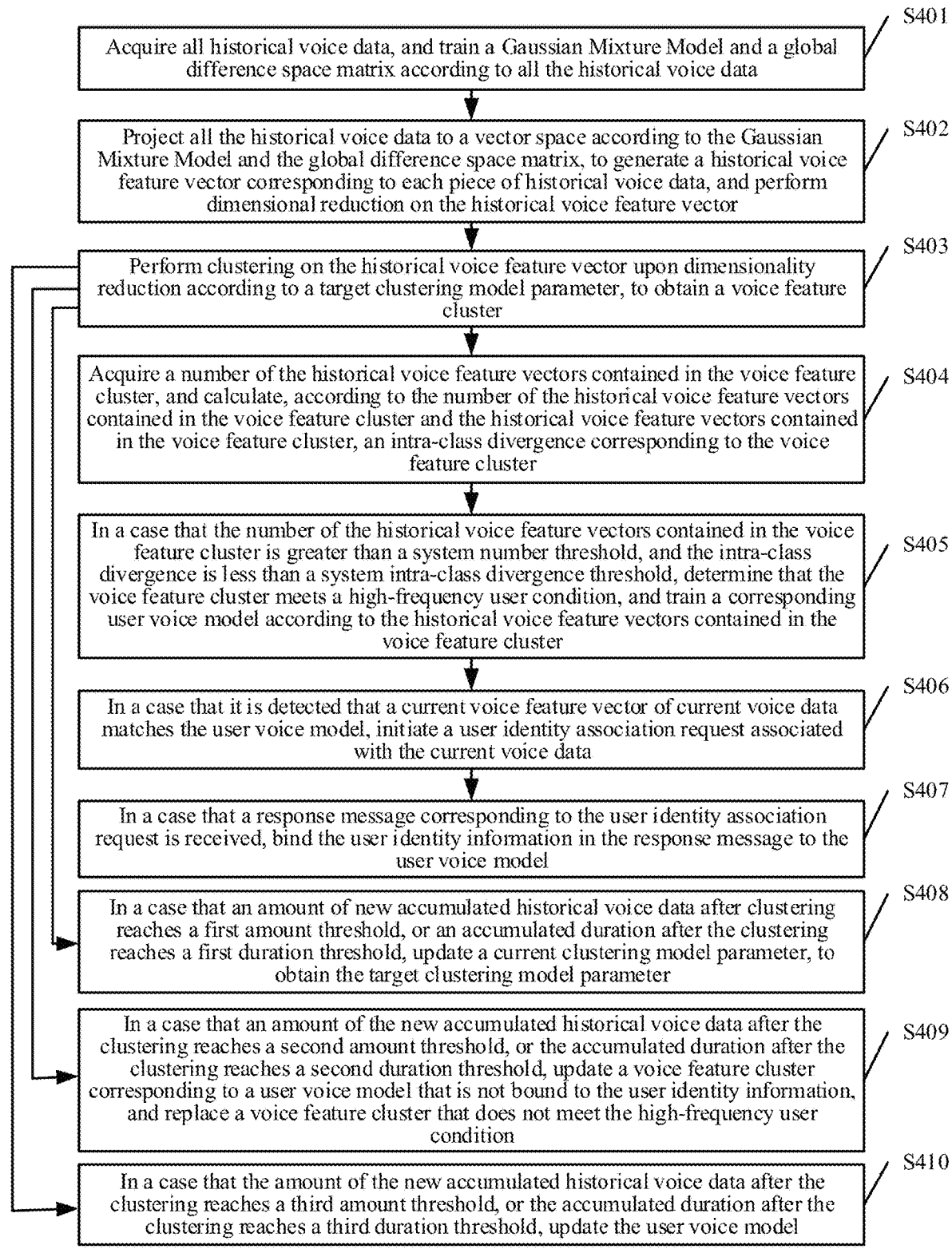
FIG. 4 is a schematic flowchart of another voice data processing method according to an embodiment of the present disclosure.

Referring to FIG. 4, a schematic flowchart of another voice data processing method according to an embodiment of the present disclosure is shown, the method including the followings.

S401. All historical voice data is acquired, and a Gaussian Mixture Model and a global difference space matrix are trained according to all the historical voice data.

S402. All the historical voice data is projected to a vector space according to the Gaussian Mixture Model and the global difference space matrix, to generate a historical voice feature vector corresponding to each piece of the historical voice data, and dimensionality reduction is performed on the historical voice feature vector.

For a specific implementation of S401 to S402, reference may be made to S301 shown in FIG. 3 and details are not described herein again.

S403. Clustering is performed, according to a target clustering model parameter, on historical voice feature vectors upon dimensionality reduction, to obtain the voice feature cluster.

In particular, a voice interaction device (the voice interaction device may be specifically the voice interaction device 100*a* integrated with functions of the backend server 100*b* shown in FIG. 1) may perform clustering, based on a DBSCAN clustering algorithm, on historical voice feature vectors upon dimensionality reduction. In the DBSCAN clustering algorithm, it may be assumed that a clustering structure can be determined through a density degree of sample distribution. The density degree may be depicted by a pair of parameters (Eps, MinPts), Eps being a neighborhood or neighbors radius when density is defined, MinPts being a threshold when a core sample is defined. In other words, the target clustering model parameter may include: the Eps (that is, a density neighborhood radius) and the MinPts (that is, a core sample threshold). Based on the DBSCAN clustering algorithm, all historical voice feature vectors upon dimensionality reduction may be used as sample points to generate a sample data set containing the sample points, and all sample points that are core points are looked up in the sample data set according to the density neighborhood radius and the core sample threshold. Any of the core points is determined as a starting point, all sample points having a density-reachability relationship with the starting point are looked up in the sample data set as reachable sample points (in order to distinguish between the same points and other sample points, the sample points having the density-reachability relationship with the starting point are defined as reachable sample points herein), a voice feature cluster containing the starting point and all the reachable sample points are generated, and next core point in all the core points is determined as the starting point. This step is repeatedly performed until all the core points are determined as the starting point.

For example, it is assumed that historical voice feature vectors corresponding to all the historical voice data are determined as a sample data set $D=\{x_1, x_2, \ldots, x_m\}$, each sample point $x_j$ being a historical voice feature vector corresponding to a piece of historical voice data, and a distance function between any two sample points being set as a dist( ). Eps-neighborhood is defined as follows: with respect to $x_j$ D, the Eps-neighborhood contains sample points with a distance from $x_j$ being not greater than Eps in D, that is, $N_{Eps}(xj)=\{x_i\ D|dist(x_i, x_j) \leq Eps\}$. Direct density-reachability is defined as follows: in a case that $x_j$ is located in Eps-neighborhood of $x_i$, and $x_i$ is a core point, $x_j$ is directly density-reachable by $x_i$. Density-reachability is defined as follows: with respect to $x_i$ and $x_j$, in a case that a sample point sequence of $p_1, p_2, \ldots, p_n$ exists, where $p_1=x_i$, $p_n=x_j$, and $p_i+1$ is density-reachable by $p_i$, $x_j$ is density-reachable by $x_i$. Density-connection is defined as follows: with respect to $x_i$ and $x_j$, in a case that an $x_k$ exists and $x_i$ and $x_j$ are both density-reachable by $x_k$, $x_i$ and $x_j$ are density-connected. Based on the foregoing concept, the DBSCAN clustering algorithm may divide all sample points in the sample data set D into three categories: core points, boundary points, and noise points. The core points are sample points no less than a quantity MinPts of sample points included in a radius of Eps. The boundary points are sample points of which the number is smaller than MinPts and that fall within a neighborhood of a core point within the radius of Eps. The noise points are sample points that are neither the core points nor the boundary points.

Therefore, a clustering cluster is defined as a set of core points and boundary points that have a density-connected relationship. In the DBSCAN clustering algorithm, all core points in a sample data set D are found according to parameters (Eps, MinPts), and any core point is used as a starting point to find all density-reachable sample points as reachable sample points, and a voice feature cluster containing the starting point and all the reachable sample points is generated until all the core points are accessed. In other words, each voice feature cluster may contain at least one historical voice feature vector with a similar feature. A specific algorithm flow of generating the voice feature cluster is described as follows:

```
input: a setD = {x_1, x_2, ..., x_m} of sample data; parameters (Eps, MinPts);
output: divide a voice feature cluster C = {C_1, C_2, ..., C_k};
process: initialize a set of core points: Ω = Ø,
  for j = 1, 2, ..., m, do
    determine Eps-neighborhoodNEps(xj) of a sample point xj,
    if |N_Eps(xj)| ≥MinPts, then add the sample point x_j to set Ω of core
    points,
    end if,
  end for,
  initialize a number of voice feature clusters: k = 0,
  initialize an unvisited set of sample data Γ=D,
  while Q≠Ø do
    record a currently unvisited sample data set: Γ_old = Γ,
    randomly select one core point ω∈Ω, initialize the queue Q = <ω>,
    Γ = Γ \ {ω},
    while Q ≠Ø do
      take out a first sample point q from the queue Q,
      if |N_Eps(q)| ≥MinPts then
        make Δ = N_Eps(q) ∩Γ,
        add sample points in Δ to the queue Q,
        Γ = Γ\Δ,
      end if,
    end while,
    k = k + 1, generate a voice feature cluster C_k = Γ_old\Γ,
    Ω = Ω\C_k,
  end while;
```

It may be learned from the foregoing content that two key parameters Eps and MinPts in the DBSCAN clustering algorithm directly determine performance of clustering.

S404. A number of the historical voice feature vectors contained in the voice feature cluster is acquired, and an intra-class divergence corresponding to the voice feature cluster is determined according to the number of the historical voice feature vectors contained in the voice feature cluster and the historical voice feature vectors contained in the voice feature cluster.

In particular, in a case that a number of the historical voice feature vectors contained in the voice feature cluster is greater than a system number threshold, and the intra-class divergence is less than a system intra-class divergence threshold, it is determined that the voice feature cluster matches a high-frequency user condition, further obtaining, through analysis, a result that which voice feature clusters meet the high-frequency condition. A formula for determining the intra-class divergence is as follows:

$$\text{divergence} = \frac{2}{|C|(|C|-1)} \sum_{1 \leq i \leq |C|} \|x_i - x_j\|_2,$$

$|C|$ representing a number of samples within a voice feature cluster (that is, a number of historical voice feature vectors contained in the voice feature cluster), $x_i$ and $x_j$ being two sample points (that is, two historical voice feature vectors in the voice feature cluster) of the voice feature cluster, and $\|o\|2$ representing 2-norm for calculating an algebraic expression. The system number threshold may be base_frequency, and the system intra-class divergence may be base_divergence. In other words, in a case that a number of samples within the voice feature cluster is greater than base_frequency and the intra-class divergence of the voice feature cluster is less than base_divergence, it may be determined that the voice feature cluster matches the high-frequency user condition. base_frequency and base_divergence are hyperparameters set by the system.

S405. In a case that the number of the historical voice feature vectors contained in the voice feature cluster is greater than a system number threshold, and the intra-class divergence is less than the system intra-class divergence threshold, it is determined that the voice feature cluster matches the high-frequency user condition, and a corresponding user voice model is trained according to the historical voice feature vectors contained in the voice feature cluster.

In particular, after a voice feature cluster is determined to meet the high-frequency user condition, the corresponding user voice model may be trained according to the historical voice feature vectors contained in the voice feature cluster. A process of training the user voice model may include: acquiring all historical voice feature vectors that meet the high-frequency user condition in the voice feature cluster, calculating a mean value or an interpolation of the acquired historical voice feature vectors, to obtain a target historical voice feature vector, and using the target historical voice feature vector as a model parameter of the user voice model corresponding to the voice feature cluster.

S406. In a case that it is detected that a current voice feature vector of the current voice data matches the user voice model, a user identity association request associated with the current voice data is initiated.

S407. In a case that a response message corresponding to the user identity association request is received, user identity information in the response message is bound to the user voice model.

For a specific implementation of S406 to S407, reference may be made to S303 to S304 in a corresponding embodiment of the foregoing FIG. 3, and details are not described herein again.

S408. In a case that an amount of new accumulated historical voice data after clustering reaches a first amount threshold, or an accumulated duration after the clustering reaches a first duration threshold, a current clustering model parameter is updated to obtain the target clustering model parameter.

In particular, due to an increase in the historical voice data, some high-frequency users may be increased. Therefore, re-clustering needs to be performed regularly to divide a new voice feature cluster. In addition, when the new voice feature cluster matches the high-frequency user condition, a corresponding user voice model may further be trained, and is bound to corresponding user identity information. Two key parameters Eps and MinPts in the DBSCAN clustering algorithm directly determine performance of clustering. In order to gradually improve performance of the clustering algorithm, Eps and MinPts may be regularly updated, that is, more accurate Eps and MinPts lead to a more precise new voice feature cluster obtained through clustering. Therefore, in a case that an amount of new accumulated historical voice data after clustering reaches a first amount threshold, or an accumulated duration after the clustering reaches a first duration threshold, all the historical voice feature vectors matching user voice models that are bound to user identity information are acquired as first historical voice feature vectors.

According to a clustering algorithm performance parameter maximization condition, and a correspondence between the first historical voice feature vectors and the bound user identity information, a current clustering model parameter is updated to obtain the target clustering model parameter. Clustering algorithm performance parameters may include two external indicators, that is, a Jaccard coefficient (JC) and a Rand index (RI). Performance of the clustering algorithm may be measured through the JC and the RI. That is, when clustering performance is improved, the JC and the RI are increased accordingly. The clustering algorithm performance parameter maximization condition may refer to a maximization condition of the JC. JC=SS/(SS+SD+DS), RI=(SS+DD)/(SS+SD+DS+DD), SS representing a number of sample point pairs with a same actual label and a same clustering label, SD representing a number of sample point pairs with the same actual label but different clustering labels, DS representing a number of sample point pairs with different actual labels but the same clustering label, and DD representing a number of sample point pairs with different actual labels and different clustering labels (the label herein may refer to identity information of a speaker).

For example, a specific process of updating a current clustering model may include: acquiring, as the first historical voice feature vectors, all historical voice feature vectors matching user voice models that are bound to the user identity information, using 70% of first historical voice feature vectors as a training set, and using the remaining 30% of the first historical voice feature vectors as a verification set; and using the training set to train one DBSCAN clustering model for maximizing the JC. In order to prevent training over-fitting, a JC of the clustering model in the verification set is determined during training, and Eps and MinPts parameters with a maximum value of the JC in the verification set are selected as optimized model parameters (that is, the target clustering model parameters). Afterwards, the target clustering model parameters may be updated regularly or quantitatively, so that the target clustering model parameters may be gradually optimized.

Alternatively, an amount of newly increased historical voice data may be accumulated after the target clustering model parameters are generated, and when the amount reaches a first amount threshold, S408 is performed. Alternatively, a duration is accumulated after the target clustering model parameters are generated, and when the accumulated duration reaches a first duration threshold, S408 is performed.

S409. In a case that an amount of new accumulated historical voice data after clustering reaches a second amount threshold, or an accumulated duration after the clustering reaches a second duration threshold, a voice feature cluster corresponding to a user voice model that is not bound to the user identity information is updated, and a voice feature cluster that does not meet the high-frequency user condition is replaced.

In particular, due to an increase in the historical voice data, some high-frequency users may be increased. Therefore, re-clustering needs to be performed regularly to divide a new voice feature cluster, and a new high-frequency user may be found through the new voice feature cluster. Therefore, in a case that the amount of new accumulated historical voice data after clustering reaches a second amount threshold, or the accumulated duration after the clustering reaches a second duration threshold, all the historical voice feature vectors matching user voice models that are not bound to the user identity information and historical voice feature vectors (that is historical voice feature vectors not belonging to a high-frequency user) that do not match all the user voice models are acquired as second historical voice feature vectors, and clustering is performed on the second historical voice feature vectors to obtain a currently generated voice feature cluster. For the process of performing clustering on the second historical voice feature vectors, reference may be made to the foregoing S403 and details are not described herein again. Before clustering is performed on the second historical voice feature vectors, dimensionality reduction may be first performed on second historical voice feature vectors on which dimensionality reduction is not performed.

Afterwards, a voice feature cluster corresponding to a user voice model that is not bound to the user identity information is updated according to currently generated voice feature clusters. The update process may specifically include: detecting whether each currently generated voice feature cluster matches the high-frequency user condition, determining, as a to-be-updated voice feature cluster, a voice feature cluster that matches the high-frequency user condition in the currently generated voice feature clusters, training a user voice model corresponding to the to-be-updated voice feature cluster, and comparing the user voice model corresponding to the to-be-updated voice feature cluster to an existing user voice model that is not bound to the user identity information before re-clustering. In a case that there is a user voice model corresponding to the to-be-updated voice feature cluster that is similar to the user voice model that is not bound to the user identity information (for example, a vector distance between i-Vectors of two user voice models are less than a preset distance threshold), user portrait data in the to-be-updated voice feature cluster may be transmitted and inherited into a voice feature cluster with a same user voice model as the to-be-updated voice feature cluster, to complete updating the voice feature cluster corresponding to the user voice model that is not bound to the user identity information.

Based on a voice feature cluster other than the to-be-updated voice feature cluster for transmitting and inheriting the user portrait data in all the currently generated voice feature clusters, the voice feature cluster that does not meet the high-frequency user condition is replaced, that is, a voice feature cluster that exists before the re-clustering and that does not meet the high-frequency user condition is deleted, and the voice feature cluster other than the to-be-updated voice feature cluster that is already configured to transmit and inherit the user portrait data in all the currently generated voice feature clusters is retained. For example, in a case that there is a voice feature cluster a1 (that does not meet the high-frequency user condition) before re-clustering, a voice feature cluster a2 (that does not meet the high-frequency user condition), a voice feature cluster a3 (that has a user voice model that is not bound to user identity information), a voice feature cluster a4 (that has a user voice model that is not bound to user identity information), and a voice feature cluster a5 (having a user voice model that is bound to user identity information) before the re-clustering, a currently generated voice feature cluster b1, a voice feature cluster b2, a voice feature cluster b3, and a voice feature cluster b4 are obtained after the re-clustering. Both the voice feature cluster b1 and the voice feature cluster b2 do not meet the high-frequency user condition, but both the voice feature cluster b3 and the voice feature cluster b4 meet the high-frequency user condition.

In addition, a user voice model corresponding to the voice feature cluster b3 and a user voice model corresponding to the voice feature cluster b4 are further trained, the user voice model corresponding to the voice feature cluster b3 being similar to the user voice model corresponding to the voice feature cluster a4. Therefore, user portrait data in the voice feature cluster b3 may be transmitted and inherited into the voice feature cluster a4, to complete updating the voice feature cluster a4. The user voice model corresponding to the voice feature cluster b4 is dissimilar from the user voice model corresponding to the voice feature cluster a4 and the user voice model corresponding to the voice feature cluster a3, so that the voice feature cluster b4, the voice feature cluster b1, and the voice feature cluster b2 may further be retained, and the voice feature cluster a1 and the voice feature cluster a2 may be deleted. In this case, all voice feature clusters in the voice interaction device include: the voice feature cluster b4, the voice feature cluster b1, the voice feature cluster b2, the updated voice feature cluster a4, the voice feature cluster a3, and the voice feature cluster a5.

S410. In a case that an amount of new accumulated historical voice data after clustering reaches a third amount threshold, or an accumulated duration after the clustering reaches a third duration threshold, the user voice model is updated.

In particular, in a case that the amount of the new accumulated historical voice data after the clustering reaches the third amount threshold, or the accumulated duration after the clustering reaches the third duration threshold, all historical voice feature vectors matching the user voice model that is bound to the user identity information are acquired as third historical voice feature vectors, and the user voice model that is bound to the user identity information is updated according to the third historical voice feature vectors. The third historical voice feature vectors corresponding to a user voice model that is bound to the user identity information may include: existing historical voice feature vectors and new accumulated historical voice feature vectors after clustering. Model parameters (that is also an i-Vector) of the user voice model are generated according to the existing historical voice feature vectors. Therefore, a process of updating the user voice model may include: calculating a mean value or an interpolation of the model parameters of the user voice model and the new accumulated historical voice feature vectors after clustering, to obtain updated historical voice feature vectors, and replacing the model parameters of the user voice model with the updated historical voice feature vectors, to complete updating the user voice model. That the user voice model is updated through calculating the mean value is used as an example. A user voice model A that is bound to user identity information contains a model parameter a1, newly increased historical voice feature vectors matching the user voice models A after clustering include: a historical voice feature vector b1, a historical voice feature vector b2, . . . , and a historical voice feature vector bn, and the model parameter=(a*a1+b*(b1+b2++bn))/(n+1) contained in the updated user voice model A, a and b being both weight values.

All the historical voice feature vectors matching the user voice model that is not bound to the user identity information may further be acquired as fourth historical voice feature vectors when the user voice model that is bound to the user identity information is updated, and the user voice model that is not bound to the user identity information is updated according to the fourth historical voice feature vectors. A specific process of updating the user voice model that is not bound to the user identity information is the same as the process of updating the user voice model that is bound to the user identity information, and details are not described herein again.

An amount of newly increased historical voice data matching the user voice model may further be accumulated after a user voice model is updated, and when the amount reaches a third amount threshold, S410 is performed. Alternatively, a duration starts to be accumulated after a user voice model is updated, and when the accumulated duration reaches a third duration threshold, S410 is performed.

S408 may be performed at any moment between S401 and S407 or before S401 or after S407, that is, a current clustering model parameter may be updated regularly or quantitatively after each clustering. Therefore, a sequence of performing S408 is not limited. S409 may be performed at any moment between S401 and S407 or before S401 or after S407, that is, re-clustering may be performed regularly or quantitatively to update or replace a corresponding voice feature cluster. Therefore, a sequence of performing S409 is not limited. S410 may be performed at any moment between S401 and S407 or before S401 or after S407, that is, a corresponding user voice model may be updated regularly or quantitatively after each clustering. Therefore, a sequence of performing S410 is not limited.

The first amount threshold, the second amount threshold, and the third amount threshold may be the same or different, and the first duration threshold, the second duration threshold, and the third duration threshold may also be the same or different, which are not limited herein. In order to ensure working efficiency of the voice interaction device, the first amount threshold may be set to be slightly less than the second amount threshold (a difference between the two amount thresholds is very small), or the first duration threshold may be set to be slightly less than the second time duration threshold (a difference between the two amount thresholds is very small), to ensure that a target clustering model parameter is updated before each clustering, so that each clustering may be performed based on the updated target clustering model parameter, thereby improving accuracy of each clustering.

In addition, the first amount threshold and the second amount threshold may be set to be both greater than the third amount threshold, or the first duration threshold and the second duration threshold may be set to be both greater than the third duration threshold, to avoid updating the target clustering model parameter and the voice feature cluster too frequently. Therefore, the excessively frequent update easily causes two target clustering model parameters before and after update to be extremely similar, further causing a waste of system resources. In addition, the excessively frequent update also easily causes few changes between a voice feature cluster before update and the voice feature cluster after update, further causing a waste of the system resources. The user voice model may be updated relatively frequently to ensure accuracy of the user voice model, so that user's voice may match a correct user voice model faster and more accurately.

In order to improve accuracy of an i-vector corresponding to each piece of voice data, a GMM may also be updated regularly or quantitatively. As time goes on, there is increasingly more accumulated historical voice data, and the GMM is trained according to all the increased historical voice data, so that accuracy of the GMM may be improved and accuracy of the calculated i-vector may be improved after the GMM is updated.

Before S401 (for example, in a stage before the voice interaction device is delivered, that is, voice of any user is not received), the voice interaction device may acquire sample voice data and set a corresponding sample user identity label for the sample voice data (that is, speaker information corresponding to each piece of the sample voice data is known). In addition, an initial clustering model parameter is trained according to a clustering algorithm performance parameter maximization condition and a correspondence between the sample voice data and the sample user identity label, and the initial clustering model parameter that is trained is determined as the target clustering model parameter. For the specific process of training the initial clustering model parameter, reference may be made to the process of updating the current clustering model parameter in the foregoing S408 and details are not described herein again.

After the initial clustering model parameter is obtained, first clustering may be performed according to the initial clustering model parameter, and the initial clustering model parameter is determined as a target clustering model parameter. Afterwards, the target clustering model parameter may be updated regularly or quantitatively. For example, 20 groups of wake-up word voice data (that is, sample voice data) containing actual identity labels (that is, sample user identity labels) of speakers, each group containing 10 speakers, and each speaker containing 10 pieces of wake-up word voice data. Wake-up word voice data of 7 speakers is randomly selected from each group as a training set, and wake-up word voice data of the remaining 3 speakers is used as a verification set. For each group of data, after an i-vector of the wake-up word voice data is extracted and dimensionality reduction is performed on the i-vector, the training set is used to train a DBSCAN clustering model to maximize the JC. In order to prevent training over-fitting, the JC of the clustering model in the verification set is determined during training, and Eps and MinPts parameters that make a maximum value of the JC in the verification set are selected as initial clustering model parameters.

Figure 5:
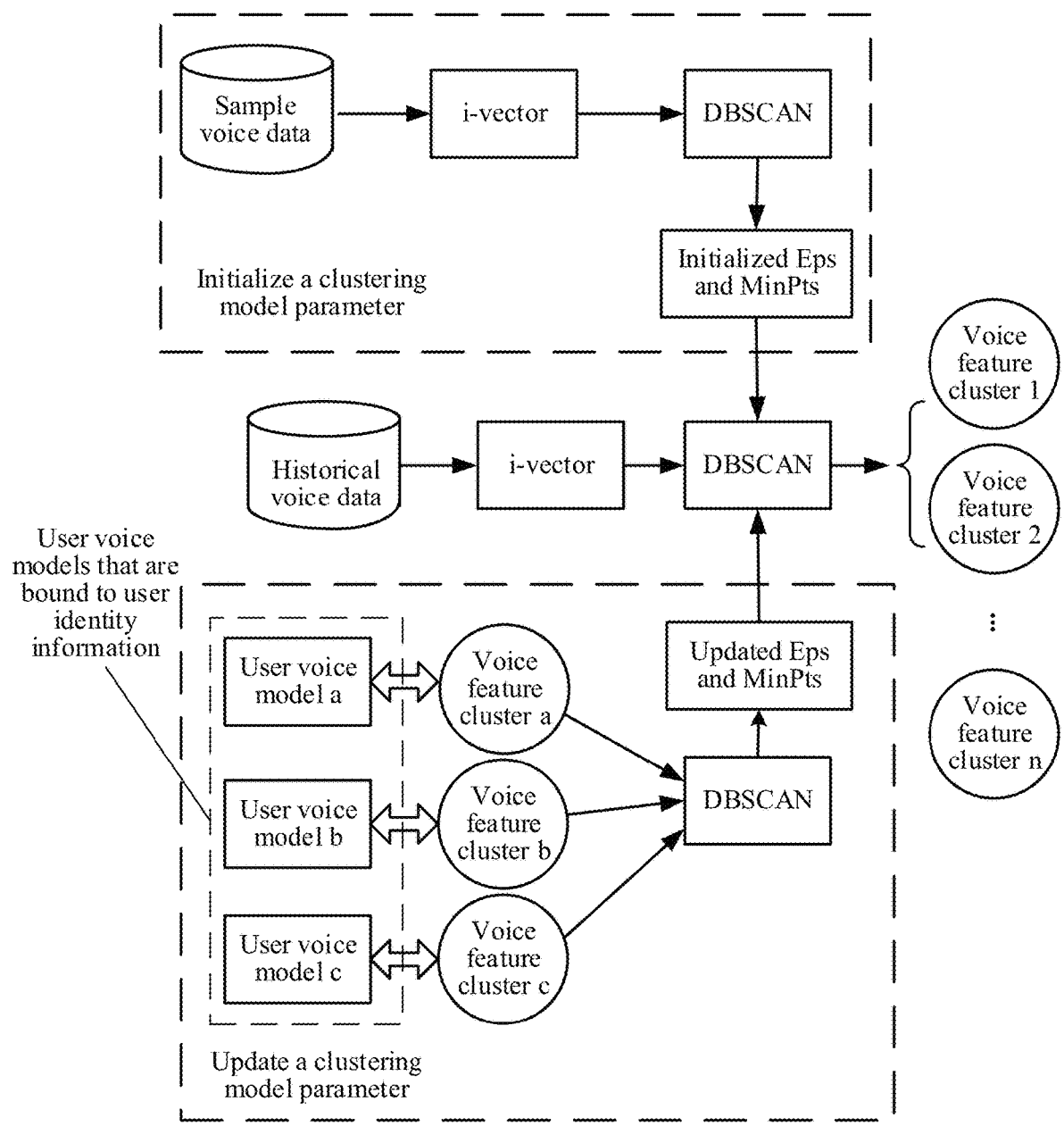
FIG. 5 is a schematic scene diagram of a parameter updating method according to an embodiment of the present disclosure.

Further, referring to FIG. 5, a schematic scenario diagram of a parameter update method according to an embodiment of the present disclosure is shown. As shown in FIG. 5, before first clustering, a voice interaction device may first acquire sample voice data, and generate an i-vector (which may be an i-vector upon dimensionality reduction) corresponding to the sample voice data, and train one DBSCAN clustering model according to the i-vector corresponding to the sample voice data to maximize the JC. In order to avoid training over-fitting, the JC of the clustering model in a verification set is determined during training, and Eps and MinPts parameters that make a maximum value of the JC in the verification set are selected as initial clustering model parameters, that is, initialized Eps and MinPts. As shown in FIG. 5, before first clustering, the voice interaction device may first generate an i-vector (which may be an i-vector upon dimensionality reduction) corresponding to historical voice data, and perform, according to the initialized Eps and MinPts, DBSCAN clustering on the i-vector corresponding to the historical voice data, so that a high-frequency user may be found and user identity may be automatically registered according to a voice feature cluster that is obtained after clustering (for details, reference may be made to S401 to S407 shown in FIG. 4).

As shown in FIG. 5, user voice models that are bound to user identity information and obtained by a voice interaction device may include a user voice model a, a user voice model b, and a user voice model c. The voice interaction device may further regularly or quantitatively train, according to voice feature clusters (a voice feature cluster a, a voice feature cluster b, and a voice feature cluster c as shown in FIG. 5) corresponding to the user voice models that are bound to the user identity information, one DBSCAN clustering model to maximize a JC. In order to avoid training over-fitting, the JC of the clustering model in a verification set is determined during training, and Eps and MinPts parameters that make a maximum value of the JC in the verification set are selected as updated clustering model parameters, that is, the updated Eps and MinPts (for details, reference may be made to S408 shown in FIG. 4).

Therefore, the voice interaction device may perform, according to the updated Eps and MinPts, DBSCAN clustering on the i-vector corresponding to the historical voice data (containing newly increased historical voice data) during next clustering, to obtain a voice feature cluster 1, a voice feature cluster 2, . . . , and a voice feature cluster n as shown in FIG. 5, update, according to the voice feature cluster 1, the voice feature cluster 2, . . . , and the voice feature cluster n, a voice feature cluster corresponding to the user voice model that is not bound to the user identity information, and replace a voice feature cluster that does not meet a high-frequency user condition (for details, reference may be made to S409 shown in FIG. 4). Afterwards, the Eps and the MinPts may be updated regularly or quantitatively according to the voice feature clusters corresponding to the user voice models that are bound to the user identity information, and with an increase in the user voice models that are bound to the user identity information, more accurate and reasonable Eps and MinPts may be gradually trained. The initialized Eps and MinPts are only used for first clustering, and most recently updated Eps and MinPts are used for each clustering thereafter.

That the voice interaction device is a smart speaker is used as an example. Technical feasibility of the foregoing solutions is verified in the embodiment of the present disclosure. The smart speaker usually does not belong to a specific user but is jointly used by a plurality of users with a limited scale. For example, a number of users using a speaker device in a home usually does not exceed 10 persons. In addition, because family members are different in age and gender, etc., differences in their voiceprint characteristics are relatively obvious.

First, a large-scale data set is used, and 10 persons are extracted randomly from 600 persons as a group without repetition, each person providing 10 identical wake-up words as voice samples. In the embodiment of the present disclosure, two groups of experiments are organized to be respectively used to verify feasibility of the foregoing clustering method and feasibility of discovering the high-frequency user.

Figure 6:
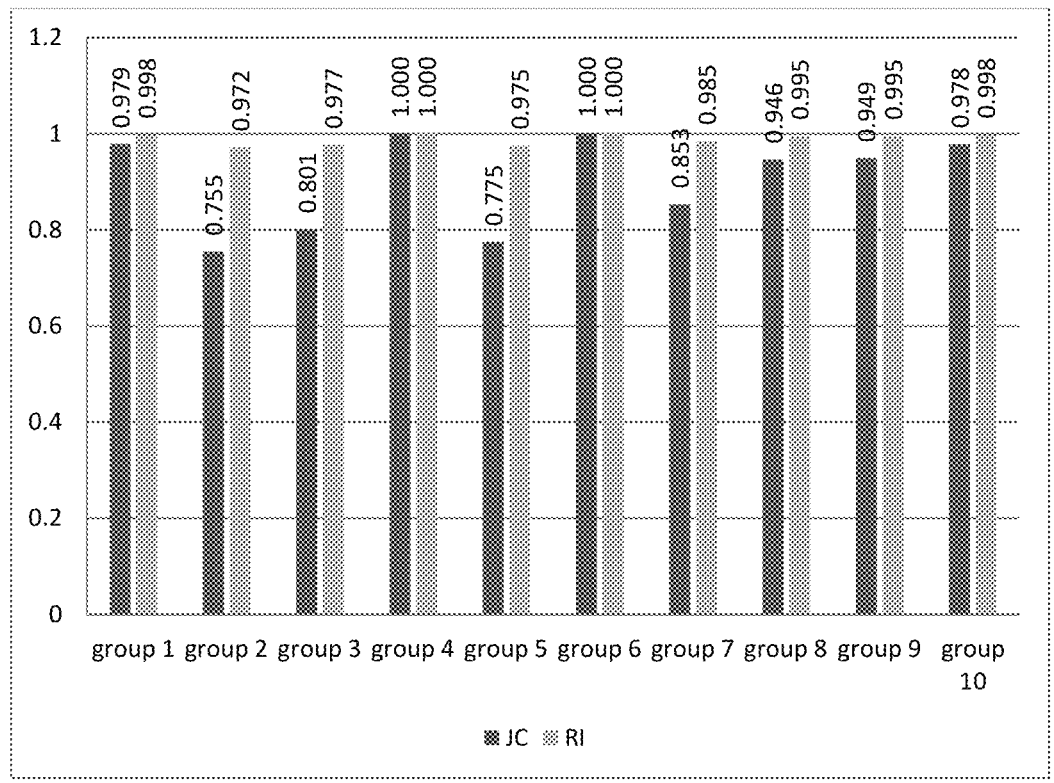
FIG. 6 is a schematic diagram of a performance verification result according to an embodiment of the present disclosure.

The process of verifying the feasibility of the clustering method may include: randomly generating 10 groups of data (each group of data including 10 voice samples with identical content respectively provided by 10 unrepeated persons) as training sets, randomly selecting voice data of 7 persons from each set for training the model parameters (Eps, MinPts) to maximize the JC, using voice data of the remaining 3 persons for verification to alleviate model over-fitting; randomly generating 10 groups of data as test sets to test performance of the clustering model that is obtained through training, and specifically measuring performance of the clustering model based on the JC and the RI. Referring to FIG. 6, a schematic diagram of a performance verification result according to an embodiment of the present disclosure is shown. As shown in FIG. 6, both JC and RI are relatively high in 10 groups of test sets (such as group 1 to group 10 in FIG. 6), indicating that the clustering model has relatively high performance. Therefore, the clustering method in the embodiment of the present disclosure has feasibility.

Figure 7:
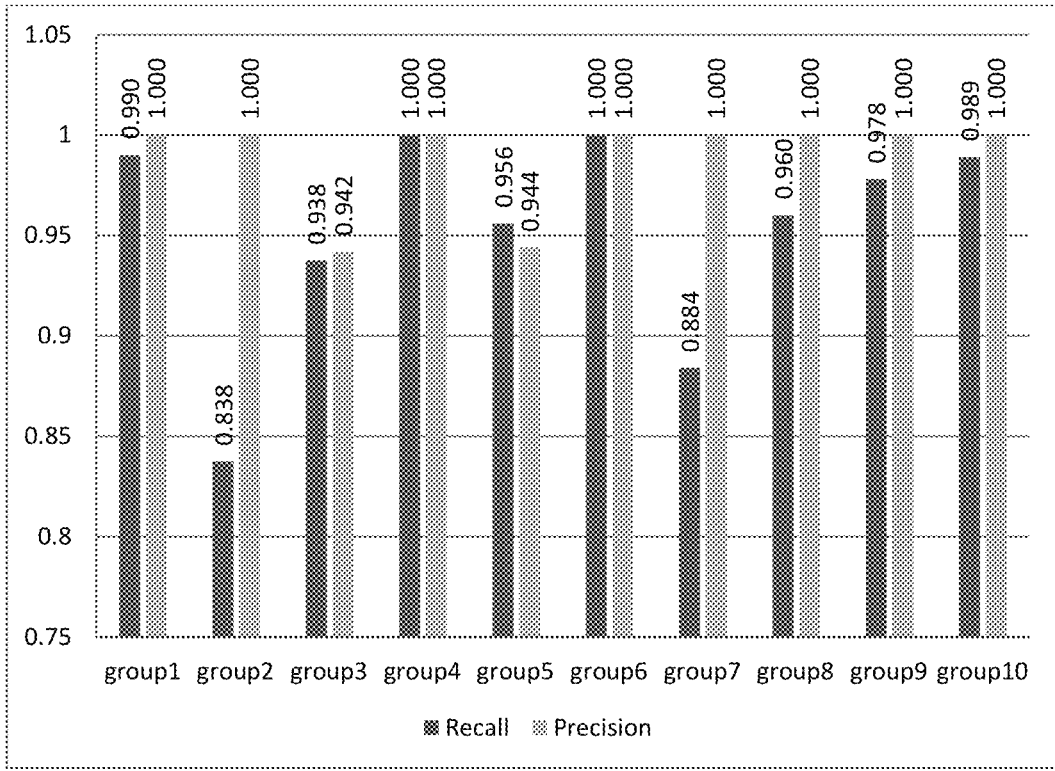
FIG. 7 is a schematic diagram of another performance verification result according to an embodiment of the present disclosure.

A process of verifying the feasibility of finding the high-frequency user may include: first, acquiring the 10 groups of test sets in the feasibility verification process of the foregoing clustering method, for each group of test sets, upon clustering and finding the high-frequency user, a category of a voice feature cluster in which the found high-frequency user is located is set to a category of a voice sample occurring most frequently in the voice feature cluster. In this case, for each group of test sets, precision and recall of each found voice feature cluster that matches the high-frequency user condition in the test set may be determined, mean values of the precision and the recall of all the voice feature clusters that meet the high-frequency user condition are used to represent performance of a high-frequency user discovery algorithm in the test set. Higher precision and recall indicate a more precise high-frequency cluster that is discovered. Referring to FIG. 7, a schematic diagram of another performance verification result according to an embodiment of the present disclosure is shown. As shown in FIG. 7, the precision and recall are relatively high in the 10 groups of test sets (such as group 1 to group 10 in FIG. 7), indicating that the high-frequency user discovery algorithm has relatively high performance. Therefore, the high-frequency user discovery in the embodiment of the present disclosure has feasibility.

Figure 8:
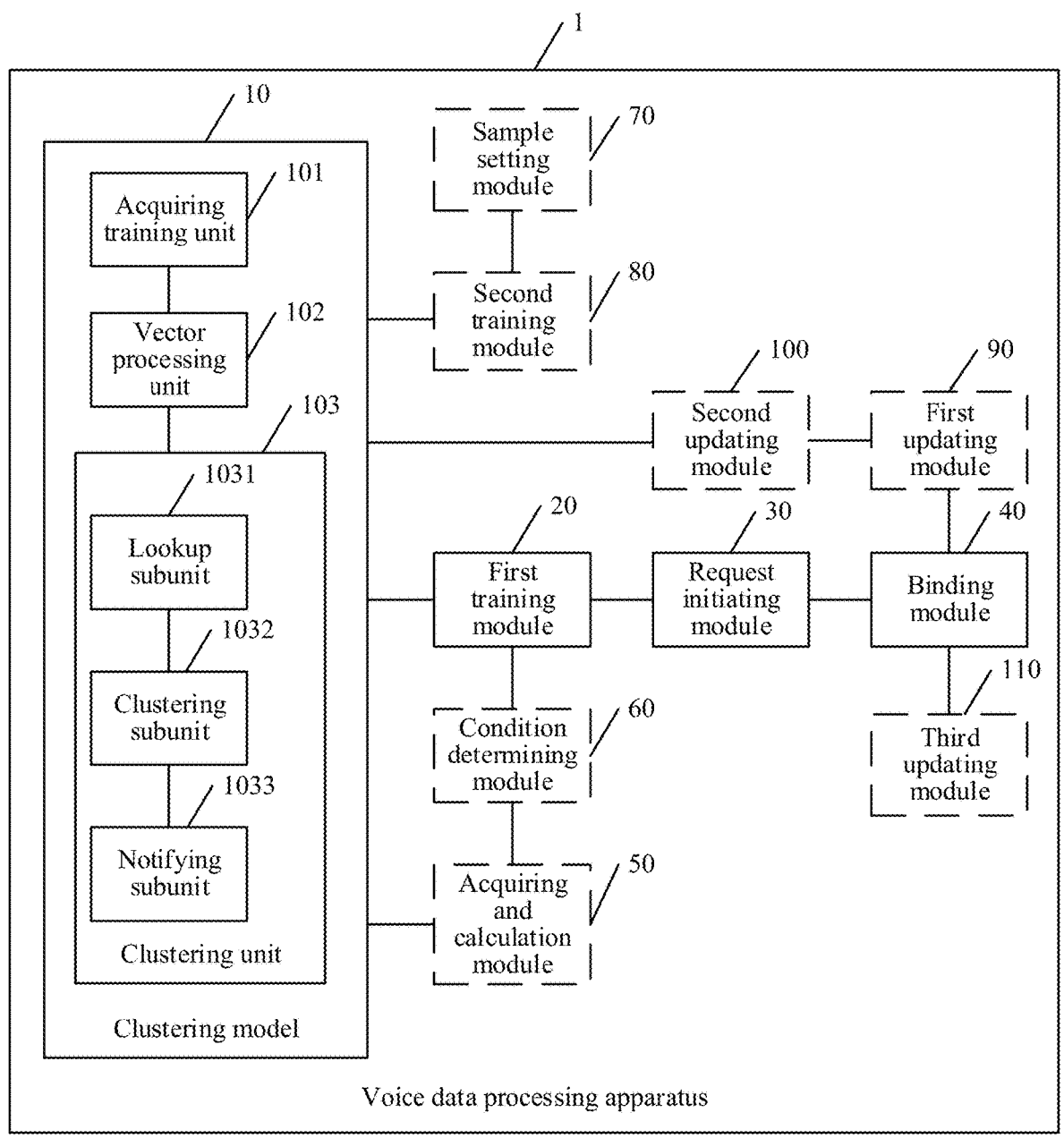
FIG. 8 is a schematic structural diagram of a voice data processing apparatus according to an embodiment of the present disclosure.

Referring to FIG. 8, a schematic structural diagram of a voice data processing apparatus according to an embodiment of the present disclosure is shown. As shown in FIG. 8, the voice data processing apparatus 1 may be applied to the voice interaction device shown in FIG. 3 or FIG. 4. The voice data processing apparatus 1 may include: a clustering module 10, a first training module 20, a request initiating module 30, and a binding module 40.

The clustering module 10 is configured to acquire historical voice data, acquire historical voice feature vectors corresponding to the historical voice data, and performing clustering on the historical voice feature vectors, to obtain a voice feature cluster; the voice feature cluster containing at least one historical voice feature vector with a similar feature.

The first training module 20 is configured to train, according to the historical voice feature vectors contained in the voice feature cluster, a corresponding user voice model in a case that the voice feature cluster matches a high-frequency user condition.

The first training module 20 may be specifically configured to calculate a mean value or an interpolation of the historical voice feature vectors contained in the voice feature cluster, to obtain a target historical voice feature vector, and use the target historical voice feature vector as a model parameter of the user voice model corresponding to the voice feature cluster.

The request initiating module 30 is configured to initiate a user identity association request associated with the current voice data in a case that it is detected that a current voice feature vector of current voice data matches the user voice model.

The binding module 40 is configured to bind user identity information in the response message to the user voice model in a case that a response message corresponding to the user identity association request is received.

For a specific function implementation of the clustering module 10, the first training module 20, the request initiating module 30, and the binding module 40, reference may be made to S301 to S304 shown in FIG. 3, and details are not described herein again.

As shown in FIG. 8, the clustering module 10 may include: an acquiring training unit 101, a vector processing unit 102, and a clustering unit 103.

The acquiring training unit 101 is configured to acquire all historical voice data, and train a Gaussian Mixture Model and a global difference space matrix according to all the historical voice data.

The vector processing unit 102 is configured to project all the historical voice data to a vector space according to the Gaussian Mixture Model and the global difference space matrix, to generate a historical voice feature vector respectively corresponding to each piece of the historical voice data, and perform dimensionality reduction on the historical voice feature vector.

The clustering unit 103 is configured to perform, according to a target clustering model parameter, clustering on the historical voice feature vector upon dimensionality reduction is performed, to obtain the voice feature cluster.

The target clustering model parameter includes a density neighborhood radius and a core sample threshold.

For a specific function implementation of the acquiring training unit 101, the vector processing unit 102, and the clustering unit 103, reference may be made to S401 to S403 shown in FIG. 4, and details are not described herein again.

Further, as shown in FIG. 8, the clustering unit 103 may include a lookup subunit 1031, a clustering subunit 1032, and a notifying subunit 1033.

The lookup subunit 1031 is configured to use all the historical voice feature vectors upon dimensionality reduction as sample points to generate a sample data set containing the sample points, and look up, according to the density neighborhood radius and the core sample threshold, all sample points that are core points in the sample data set.

The clustering subunit 1032 is configured to determine any of the core points as a starting point in all the core points, and look up, as reachable sample points, all the sample points having a density-reachable relationship with the starting point in the sample data set, and generate a voice feature cluster containing the starting point and all of the reachable sample points.

The notifying subunit 1033 is configured to determine a next core point in all the core points as the starting point, and notify the clustering subunit 1032 of generating the voice feature cluster corresponding to the starting point until all the core points are determined as the starting points.

For a specific function implementation of the lookup subunit 1031, the clustering subunit 1032, and the notifying subunit 1033, reference may be made to S403 shown in FIG. 4, and details are not described herein again.

As shown in FIG. 8, the voice data processing apparatus 1 may further include: an acquiring and calculation module 50, a condition determining module 60, a sample setting module 70, a second training module 80, a first updating module 90, a second updating module 100, and a third updating module 110.

The acquiring and calculation module 50 is configured to acquire a number of the historical voice feature vectors contained in the voice feature cluster, and determine, according to the number of the historical voice feature vectors contained in the voice feature cluster and the historical voice feature vectors contained in the voice feature cluster, an intra-class divergence corresponding to the voice feature cluster.

The condition determining module 60 is configured to determine that the voice feature cluster matches the high-frequency user condition in a case that the number of the historical voice feature vectors contained in the voice feature cluster is greater than a system number threshold, and the intra-class divergence is less than a system intra-class divergence threshold.

For a specific function implementation of the acquiring and calculation module 50 and the condition determining module 60, reference may be made to S404 to S405 shown in FIG. 4, and details are not described herein again.

The sample setting module 70 is configured to acquire sample voice data, and set a corresponding sample user identity label for the sample voice data.

The second training module 80 is configured to train an initial clustering model parameter according to a clustering algorithm performance parameter maximization condition and a correspondence between the sample voice data and the sample user identity label, and determine the trained initial clustering model parameter as the target clustering model parameter.

For a specific function implementation of the sample setting module 70 and the second training module 80, reference may be made to the process of initializing the clustering model parameter shown in FIG. 4, and details are not described herein again.

The first updating module 90 is configured to acquire, as first historical voice feature vectors, all historical voice feature vectors matching user voice models that are bound to the user identity information in a case that an amount of new accumulated historical voice data after clustering reaches a first amount threshold, or an accumulated duration after the clustering reaches a first duration threshold, and update a current clustering model parameter according to a clustering algorithm performance parameter maximization condition and a correspondence between the first historical voice feature vectors and the bound user identity information, to obtain the target clustering model parameter.

For a specific function implementation of the first updating module 90, reference may be made to S408 shown in FIG. 4, and details are not described herein again.

The second updating module 100 is configured to acquire, as second historical voice feature vectors, all the historical voice feature vectors matching user voice models that are not bound to the user identity information and historical voice feature vectors that do not match all the user voice models in a case that an amount of accumulated historical voice data after clustering reaches a second amount threshold, or an accumulated duration after the clustering reaches a second duration threshold perform clustering on the second historical voice feature vectors, to obtain a currently generated voice feature cluster, update, according to the currently generated voice feature cluster, the voice feature cluster corresponding to the user voice models that are not bound to the user identity information, and replace a voice feature cluster that does not meet the high-frequency user condition.

For a specific function implementation of the second updating module 100, reference may be made to S409 shown in FIG. 4, and details are not described herein again.

The third updating module 110 is configured to acquire, as third historical voice feature vectors, all of the historical voice feature vectors matching user voice models that are bound to the user identity information in a case that an amount of new accumulated historical voice data after clustering reaches a third amount threshold, or an accumulated duration after the clustering reaches a third duration threshold, and update, according to the third historical voice feature vectors, the user voice models that are bound to the user identity information.

The third updating module 110 is further configured to acquire, as fourth historical voice feature vectors, all of the historical voice feature vectors matching user voice models that are not bound to the user identity information, and update, according to the fourth historical voice feature vectors, the user voice models that are not bound to the user identity information.

For a specific function implementation of the third updating module 110, reference may be made to S410 shown in FIG. 4, and details are not described herein again.

Figure 9:
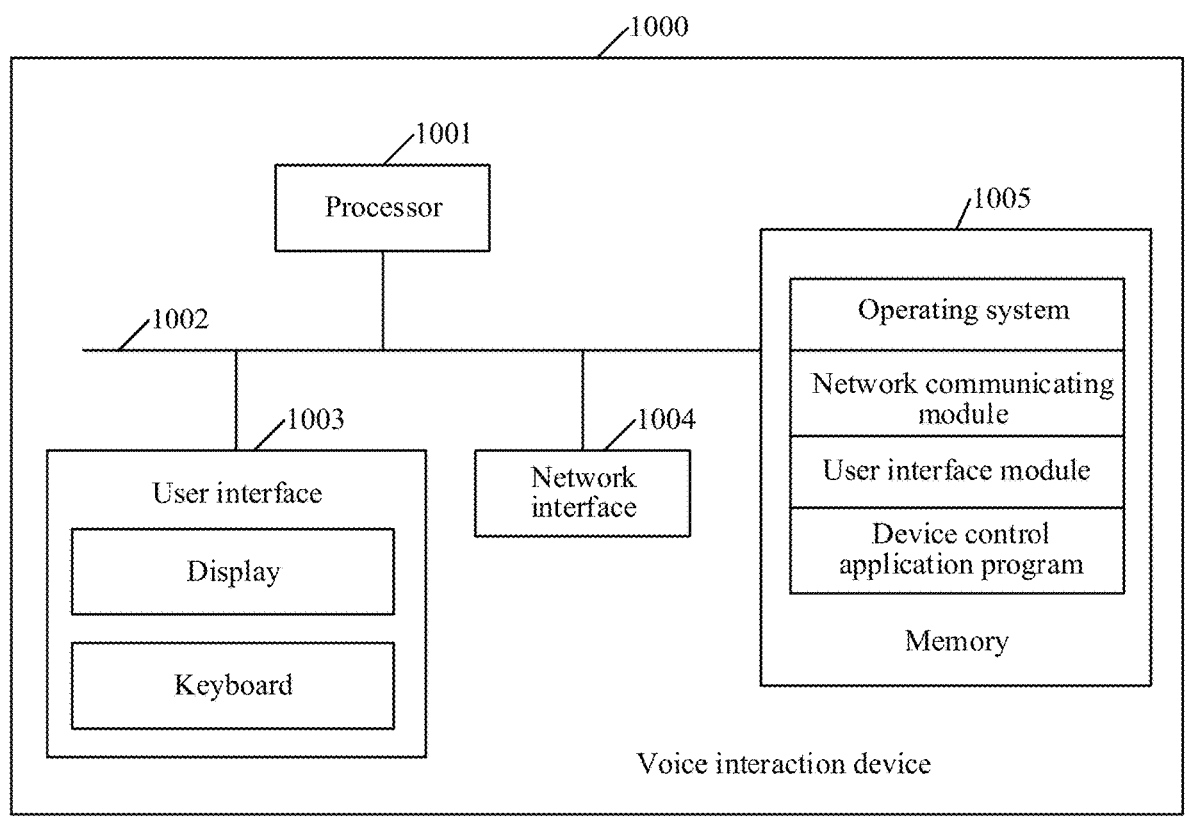
FIG. 9 is a schematic structural diagram of a voice interaction device according to an embodiment of the present disclosure.

FIG. 9 is a schematic structural diagram of a voice interaction device according to an embodiment of the present disclosure. As shown in FIG. 9, the voice interaction device 1000 may be the voice interaction device in the embodiment corresponding to FIG. 3 or FIG. 4. The voice interaction device 1000 may include a processor 1001, a network interface 1004, and a memory 1005. In addition, the voice interaction device 1000 may further include a user interface 1003 and at least one communications bus 1002. The communications bus 1002 is configured to implement connection and communication between the components. The user interface 1003 may include a display and a keyboard, and optionally, the user interface 1003 may further include a standard wired interface and a standard wireless interface. The network interface 1004 may include a standard wired interface and a standard wireless interface (such as a Wi-Fi interface). The memory 1005 may be a high-speed RAM memory, or may be a non-volatile memory, for example, at least one magnetic disk memory. The memory 1005 may alternatively be at least one storage apparatus remote to the processor 1001. As shown in FIG. 9, as a computer storage medium, the memory 1005 may include an operating system, a network communications module, a user interface module, and a device control application program.

In the voice interaction device 1000 shown in FIG. 9, the network interface 1004 may provide a network communication function; the user interface 1003 is mainly configured to provide an input interface for the user; and the processor 1001 may be configured to call the device control application program stored in the memory 1005 to implement the voice data processing method described in FIG. 3 and FIG. 4.

It should be understood that the voice interaction device 1000 described in this embodiment of the present disclosure may implement the voice data processing method described in the embodiment corresponding to FIG. 3 or FIG. 4, or may include the voice data processing apparatus 1 described in the embodiment corresponding to FIG. 8, and details are not described herein again.

In addition, the embodiments of the present disclosure further provide a computer storage medium. The computer storage medium stores a computer program executed by the voice data processing apparatus 1 described above. The computer program includes a program instruction, and the processor can perform the voice data processing method described in the embodiment corresponding to FIG. 3 or FIG. 4 when executing the program instruction. Therefore, details are not described herein again. In addition, the description of the beneficial effects brought by using the same method will not be described herein again. For technical details not disclosed in this embodiment of the computer storage medium in the present disclosure, refer to the descriptions of the method embodiments in the present disclosure.

A person skilled in this field can understand that, all or some procedures in the methods in the foregoing embodiments may be implemented by a program instructing related hardware. The program may be stored in a computer readable storage medium. When being executed, the program may implement the procedures according to the embodiments of the foregoing methods. The storage medium may be a magnetic disk, an optical disc, a read-only memory (ROM), a random access memory (RAM), or the like.

The foregoing disclosure is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A voice data processing method performed by a voice interaction device, comprising:
acquiring historical voice data, acquiring historical voice feature vectors corresponding to the historical voice data, and performing clustering on the historical voice feature vectors to obtain one or more voice feature clusters, each voice feature cluster comprising historical voice feature vectors with a similar feature;
for each voice feature cluster:
determining, according to a number of the historical voice feature vectors contained in the voice feature cluster and the historical voice feature vectors contained in the voice feature cluster, an intra-class divergence corresponding to the voice feature cluster; and
upon determining that the number of the historical voice feature vectors contained in the voice feature cluster is greater than a system number threshold, and the intra-class divergence is less than a system intra-class divergence threshold, determining the voice feature cluster as a target voice feature cluster that matches a high-frequency user condition;
upon determining the target voice feature cluster, training a corresponding user voice model according to a target historical voice feature vector contained in the target voice feature cluster;
upon detecting that a current voice feature vector of current voice data matches the user voice model, initiating a user identity association request associated with the current voice data; and
upon determining that a response message corresponding to the user identity association request is received, binding user identity information in the response message to the user voice model.

2. The method according to claim 1, wherein the acquiring historical voice data, acquiring historical voice feature vectors corresponding to the historical voice data, and performing clustering on the historical voice feature vectors to obtain one or more voice feature clusters further comprises:
training a Gaussian Mixture Model and a global difference space matrix according to the historical voice data;
projecting the historical voice data to a vector space according to the Gaussian Mixture Model and the global difference space matrix, to generate the historical voice feature vector corresponding to each piece of the historical voice data, and reducing dimensionality of the historical voice feature vector; and
performing clustering, according to a target clustering model parameter, on the historical voice feature vectors upon dimensionality reduction, to obtain the one or more voice feature clusters.

3. The method according to claim 2, wherein:
the target clustering model parameter comprises: a density neighborhood radius and a core sample threshold;
the performing clustering, according to a target clustering model parameter, on the historical voice feature vectors upon dimensionality reduction, to obtain the one or more voice feature clusters further comprises:
generating a sample data set containing sample points by using, as the sample points, all of the historical voice feature vectors upon dimensionality reduction, and looking, according to the density neighborhood radius and the core sample threshold, up all sample points that are core points in the sample data set; and
determining any of the core points as a starting point in all of the core points, and looking up all sample points having a density-reachability relationship with the starting point in the sample data set as reachable sample points, generating a voice feature cluster containing the starting point and all of the reachable sample points, determining next core point in all of the core points as the starting point, and repeatedly performing this operation until all of the core points are determined as the starting point.

4. The method according to claim 2, further comprising:
obtaining sample voice data, and setting a corresponding sample user identity label for the sample voice data; and
training an initial clustering model parameter according to a clustering algorithm performance parameter maximization condition and a correspondence between the sample voice data and the sample user identity label, and determining the trained initial clustering model parameter as the target clustering model parameter.

5. The method according to claim 2, further comprising:
upon determining that an amount of new accumulated historical voice data after the clustering reaches a first amount threshold, or upon determining that an accumulated duration after the clustering reaches a first duration threshold, acquiring, as first historical voice feature vectors, all historical voice feature vectors matching user voice models that are bound to user identity information; and
updating, according to a clustering algorithm performance parameter maximization condition and a correspondence between the first historical voice feature vectors and the bound user identity information, the current clustering model parameter to obtain the target clustering model parameter.

6. The method according to claim 2, further comprising:
upon determining that an amount of new accumulated historical voice data after clustering reaches a second amount threshold or an accumulated duration after the clustering reaches a second duration threshold, acquiring, as second historical voice feature vectors, all historical voice feature vectors matching user voice models that are not bound to user identity information and historical voice feature vectors that do not match all of the user voice models, and performing clustering on the second historical voice feature vectors to obtain a currently generated voice feature cluster; and
updating, according to the currently generated voice feature cluster, a voice feature cluster corresponding to a user voice model that is not bound to user identity information, and replacing a voice feature cluster that does not meet the high-frequency user condition.

7. The method according to claim 2, further comprising:
upon determining that an amount of new accumulated historical voice data after clustering reaches a third amount threshold, or an accumulated duration after the clustering reaches a third duration threshold, acquiring, as third historical voice feature vectors, all historical voice feature vectors matching user voice models that are bound to the user identity information, and updating, according to the third historical voice feature vectors, user voice models that are bound to the user identity information; and acquiring, as fourth historical voice feature vectors, all historical voice feature vectors matching user voice models that are not bound to the user identity information, and updating, according to the fourth historical voice feature vectors, the user voice models that are not bound to the user identity information.

8. The method according to claim 1, wherein the training a corresponding user voice model according to target historical voice feature vectors contained in the target voice feature cluster further comprises:
determining a mean value or an interpolation of the historical voice feature vectors contained in the target voice feature cluster, to obtain the target historical voice feature vector, and using the target historical voice feature vector as a model parameter of the user voice model corresponding to the target voice feature cluster.

9. A voice interaction device, comprising:
a memory configured to store program code; and
a processor being connected to the memory and being configured to invoke the program code to perform:
acquiring historical voice data, acquiring historical voice feature vectors corresponding to the historical voice data, and performing clustering on the historical voice feature vectors to obtain one or more voice feature clusters, each voice feature cluster comprising historical voice feature vectors with a similar feature;
for each voice feature cluster:
determining, according to a number of the historical voice feature vectors contained in the voice feature cluster and the historical voice feature vectors contained in the voice feature cluster, an intra-class divergence corresponding to the voice feature cluster; and
upon determining that the number of the historical voice feature vectors contained in the voice feature cluster is greater than a system number threshold, and the intra-class divergence is less than a system intra-class divergence threshold, determining the voice feature cluster as a target voice feature cluster that matches a high-frequency user condition;
upon determining the target voice feature cluster, training a corresponding user voice model according to a target historical voice feature vector contained in the target voice feature cluster;
upon detecting that a current voice feature vector of current voice data matches the user voice model, initiating a user identity association request associated with the current voice data; and
upon determining that a response message corresponding to the user identity association request is received, binding user identity information in the response message to the user voice model.

10. The voice interaction device according to claim 9, wherein the processor is further configured to perform:
training a Gaussian Mixture Model and a global difference space matrix according to the historical voice data;
projecting the historical voice data to a vector space according to the Gaussian Mixture Model and the global difference space matrix, to generate the historical voice feature vector corresponding to each piece of the historical voice data, and reducing dimensionality of the historical voice feature vector; and
performing clustering, according to a target clustering model parameter, on the historical voice feature vectors upon dimensionality reduction, to obtain the one or more voice feature clusters.

11. The voice interaction device according to claim 10, wherein:
the target clustering model parameter comprises: a density neighborhood radius and a core sample threshold; and
the processor is further configured to perform:
generating a sample data set containing sample points by using, as the sample points, all of the historical voice feature vectors upon dimensionality reduction, and looking, according to the density neighborhood radius and the core sample threshold, up all sample points that are core points in the sample data set; and
determining any of the core points as a starting point in all of the core points, looking up all of the sample points having a density-reachability relationship with the starting point in the sample data set as reachable sample points, and generating a voice feature cluster containing the starting point and all of the reachable sample points; and
determining next core point in all of the core points as the starting point, and notifying a clustering subunit of generating the voice feature cluster corresponding to the starting point until all of the core points are determined as the starting points.

12. The voice interaction device according to claim 10, wherein the processor is further configured to perform:
obtaining sample voice data, and setting a corresponding sample user identity label for the sample voice data; and
training an initial clustering model parameter according to a clustering algorithm performance parameter maximization condition and a correspondence between the sample voice data and the sample user identity label, and determining the trained initial clustering model parameter as the target clustering model parameter.

13. The voice interaction device according to claim 10, wherein the processor is further configured to perform:
upon determining that an amount of new accumulated historical voice data after the clustering reaches a first amount threshold, or upon determining that an accumulated duration after the clustering reaches a first duration threshold, acquiring, as first historical voice feature vectors, all historical voice feature vectors matching user voice models that are bound to user identity information; and
updating, according to a clustering algorithm performance parameter maximization condition and a correspondence between the first historical voice feature vector and the bound user identity information, the current clustering model parameter to obtain the target clustering model parameter.

14. The voice interaction device according to claim 10, wherein the processor is further configured to perform:
determining that an amount of new accumulated historical voice data after clustering reaches a second amount threshold or an accumulated duration after the clustering reaches a second duration threshold, acquiring, as second historical voice feature vectors, all historical voice feature vectors matching user voice models that are not bound to user identity information and historical voice feature vectors that do not match all of the user voice models, and performing clustering on the second historical voice feature vectors to obtain a currently generated voice feature cluster; and updating, according to the currently generated voice feature cluster, a voice feature cluster corresponding to a user voice model that is not bound to user identity information, and replacing a voice feature cluster that does not meet the high-frequency user condition.

15. The voice interaction device according to claim 10, wherein the processor is further configured to perform:

upon determining that an amount of new accumulated historical voice data after clustering reaches a third amount threshold, or an accumulated duration after the clustering reaches a third duration threshold, acquiring, as third historical voice feature vectors, all historical voice feature vectors matching user voice models that are bound to the user identity information, and updating, according to the third historical voice feature vectors, user voice models that are bound to the user identity information; and acquiring, as fourth historical voice feature vectors, all historical voice feature vectors matching user voice models that are not bound to the user identity information, and updating, according to the fourth historical voice feature vectors, the user voice models that are not bound to the user identity information.

16. The voice interaction device according to claim 9, wherein the processor is further configured to perform:

calculating a mean value or an interpolation of the historical voice feature vectors contained in the target voice feature cluster, to obtain the target historical voice feature vector, and using the target historical voice feature vector as a model parameter of the user voice model corresponding to the target voice feature cluster.

17. A non-transitory computer-readable storage medium storing computer program instructions executable by at least one processor to perform:

acquiring historical voice data, acquiring historical voice feature vectors corresponding to the historical voice data, and performing clustering on the historical voice feature vectors to obtain one or more voice feature clusters, each voice feature cluster comprising historical voice feature vectors with a similar feature;

for each voice feature cluster:
determining, according to a number of the historical voice feature vectors contained in the voice feature cluster and the historical voice feature vectors contained in the voice feature cluster, an intra-class divergence corresponding to the voice feature cluster; and upon determining that the number of the historical voice feature vectors contained in the voice feature cluster is greater than a system number threshold, and the intra-class divergence is less than a system intra-class divergence threshold, determining the voice feature cluster as a target voice feature cluster that matches a high-frequency user condition;

upon determining the target voice feature cluster, training a corresponding user voice model according to a target historical voice feature vector contained in the target voice feature cluster;

upon detecting that a current voice feature vector of current voice data matches the user voice model, initiating a user identity association request associated with the current voice data; and upon determining that a response message corresponding to the user identity association request is received, binding user identity information in the response message to the user voice model.

* * * * *